(12) United States Patent
Biskeborn et al.

(10) Patent No.: US 9,472,210 B2
(45) Date of Patent: Oct. 18, 2016

(54) MINISKIRT TAPE HEAD HAVING QUASI-STATICALLY TILTED TRANSDUCER ARRAYS

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/860,656

(22) Filed: Sep. 21, 2015

(65) Prior Publication Data

US 2016/0012833 A1    Jan. 14, 2016

Related U.S. Application Data

(62) Division of application No. 14/028,444, filed on Sep. 16, 2013, now Pat. No. 9,214,164.

(51) Int. Cl.
*G11B 5/29* (2006.01)
*G11B 5/265* (2006.01)
(Continued)

(52) U.S. Cl.
CPC ....... *G11B 5/00821* (2013.01); *G11B 5/00826* (2013.01); *G11B 5/10* (2013.01); *G11B 5/187* (2013.01); *G11B 5/1872* (2013.01);
(Continued)

(58) Field of Classification Search
CPC ..... G11B 5/00826; G11B 5/584; G11B 5/29; G11B 5/3163; G11B 5/00813; G11B 5/4893; G11B 5/488
USPC .......................................................... 360/121
See application file for complete search history.

(56) References Cited

U.S. PATENT DOCUMENTS 3,893,176 A    7/1975 Jones
3,924,268 A    12/1975 McIntosh et al.
(Continued)

FOREIGN PATENT DOCUMENTS

CN    1920954 A    2/2007
CN    101149931 A    3/2008
(Continued)

OTHER PUBLICATIONS

Argumedo et al., "Scaling tape-recording areal densities to 100 Gb/in2," 2008 IBM, IBM Journal of Research & Development, vol. 52, No. 4/5, Jul./Sep. 2008, pp. 513-527.
(Continued)

*Primary Examiner* — Adam B Dravininkas
(74) *Attorney, Agent, or Firm* — Zilka-Kotab, PC

(57) ABSTRACT

In one general embodiment, an apparatus includes a magnetic head. The magnetic head has a first portion and a second portion, the first portion and the second portion providing a tape bearing surface. The first portion has an opening at least partially encircling the second portion. The second portion has at least one array of transducers. A longitudinal axis of each of the at least one array of transducers is defined between opposite ends thereof, and is oriented at an angle relative to a line oriented orthogonally to the intended direction of tape travel thereacross, the angle being between 0.2° and about 10°. The second portion has a first edge oriented at a second angle between 0.2° and about 10° relative to the line, and a second edge opposite the first edge, the second edge being oriented at a third angle between 0.2° and about 10° relative to the line.

20 Claims, 17 Drawing Sheets

(51) Int. Cl.
| | | |
|---|---|---|
| *G11B 5/008* | (2006.01) | |
| *G11B 5/584* | (2006.01) | |
| *G11B 5/31* | (2006.01) | |
| *G11B 5/10* | (2006.01) | |
| *G11B 5/187* | (2006.01) | |
| *G11B 15/60* | (2006.01) | |
| *G11B 5/48* | (2006.01) | |
| *G11B 5/53* | (2006.01) | |

(52) U.S. Cl.
CPC .............. *G11B 5/31* (2013.01); *G11B 5/4893* (2013.01); *G11B 5/531* (2013.01); *G11B 5/584* (2013.01); *G11B 15/60* (2013.01)

(56) References Cited

U.S. PATENT DOCUMENTS

| | | |
|---|---|---|
| 3,943,566 A | 3/1976 | Brock et al. |
| 4,539,615 A | 9/1985 | Arai et al. |
| 4,752,846 A | 6/1988 | Proehl |
| 4,821,129 A | 4/1989 | Culp |
| 4,922,352 A | 5/1990 | Culp |
| 5,060,210 A | 10/1991 | Fennema et al. |
| 5,307,217 A | 4/1994 | Saliba |
| 5,371,638 A | 12/1994 | Saliba |
| 5,574,606 A | 11/1996 | Kimura |
| 5,680,278 A | 10/1997 | Sawtelle, Jr. |
| 5,684,656 A | 11/1997 | Jung |
| 5,854,726 A | 12/1998 | Kubota et al. |
| 5,862,014 A | 1/1999 | Nute |
| 5,867,339 A | 2/1999 | Panish et al. |
| 5,883,760 A | 3/1999 | Yamada et al. |
| 6,038,108 A | 3/2000 | Dee et al. |
| 6,040,964 A | 3/2000 | Saliba |
| 6,088,184 A | 7/2000 | Hu |
| 6,130,804 A | 10/2000 | Panish et al. |
| 6,188,532 B1 | 2/2001 | Albrecht et al. |
| 6,188,535 B1 | 2/2001 | Lemke et al. |
| 6,222,698 B1 | 4/2001 | Barndt et al. |
| 6,275,350 B1 | 8/2001 | Barndt |
| 6,307,718 B1 | 10/2001 | Kasetty |
| 6,339,793 B1 | 1/2002 | Bostian et al. |
| 6,369,982 B2 | 4/2002 | Saliba |
| 6,587,305 B2 | 7/2003 | Saliba |
| 6,650,496 B2 | 11/2003 | Nozieres et al. |
| 6,751,055 B1 | 6/2004 | Alfoqaha et al. |
| 6,757,128 B2 | 6/2004 | Yip |
| 6,781,784 B2 | 8/2004 | Peterson |
| 6,947,247 B2 | 9/2005 | Schwarz et al. |
| 6,965,490 B2 | 11/2005 | Ito |
| 7,009,812 B2 | 3/2006 | Hsu et al. |
| 7,054,093 B1 | 5/2006 | Anderson et al. |
| 7,142,388 B2 | 11/2006 | Tateishi et al. |
| 7,193,812 B2 | 3/2007 | Eaton |
| 7,239,465 B1 | 7/2007 | Watson et al. |
| 7,253,986 B2 | 8/2007 | Berman et al. |
| 7,342,738 B1 | 3/2008 | Anderson et al. |
| 7,428,120 B2 | 9/2008 | Berman et al. |
| 7,474,488 B2 | 1/2009 | Czarnecki et al. |
| 7,480,117 B2 | 1/2009 | Biskeborn et al. |
| 7,486,464 B2 | 2/2009 | Saliba |
| 7,681,793 B2 | 3/2010 | Biskeborn et al. |
| 7,724,459 B2 | 5/2010 | Czarnecki et al. |
| 7,764,460 B2 | 7/2010 | Bates et al. |
| 7,766,236 B2 | 8/2010 | Biskeborn et al. |
| 7,889,454 B2 | 2/2011 | Johnson et al. |
| 7,952,832 B2 | 5/2011 | Biskeborn et al. |
| 8,004,792 B2 | 8/2011 | Biskeborn et al. |
| 8,045,290 B2 | 10/2011 | McKinstry et al. |
| 8,054,576 B2 | 11/2011 | Bui et al. |
| 8,054,579 B2 | 11/2011 | Biskeborn |
| 8,094,402 B2 | 1/2012 | Bui et al. |
| 8,130,467 B2 | 3/2012 | Biskeborn et al. |
| 8,154,811 B2 | 4/2012 | Barsotti et al. |
| 8,265,487 B2 | 9/2012 | Schunk |
| 8,587,902 B2 | 11/2013 | Biskeborn et al. |
| 8,599,508 B1 | 12/2013 | Burd |
| 8,687,324 B2 | 4/2014 | Biskeborn et al. |
| 8,773,795 B1 | 7/2014 | Biskeborn |
| 8,797,682 B1 | 8/2014 | Biskeborn et al. |
| 8,810,957 B1 | 8/2014 | Biskeborn et al. |
| 8,902,528 B1 | 12/2014 | Biskeborn et al. |
| 8,976,482 B2 | 3/2015 | Cherubini et al. |
| 9,007,712 B1 | 4/2015 | Biskeborn et al. |
| 9,129,614 B2 | 9/2015 | Biskeborn et al. |
| 9,214,164 B2 | 12/2015 | Biskeborn et al. |
| 9,299,365 B2 | 3/2016 | Biskeborn et al. |
| 2001/0015870 A1 | 8/2001 | Saliba |
| 2002/0034042 A1 | 3/2002 | Hungerford et al. |
| 2002/0163752 A1 | 11/2002 | Peterson |
| 2002/0186496 A1 | 12/2002 | Saliba et al. |
| 2004/0223248 A1 | 11/2004 | Dugas et al. |
| 2005/0068671 A1 | 3/2005 | Hsu et al. |
| 2005/0135017 A1 | 6/2005 | Biskeborn |
| 2005/0152067 A1 | 7/2005 | Yip et al. |
| 2005/0157422 A1 | 7/2005 | Dugas et al. |
| 2005/0168865 A1 | 8/2005 | Simmons et al. |
| 2005/0259364 A1 | 11/2005 | Yip |
| 2006/0039082 A1 | 2/2006 | Biskeborn et al. |
| 2006/0126207 A1 | 6/2006 | Johnson et al. |
| 2006/0126212 A1 | 6/2006 | Anderson et al. |
| 2006/0232884 A1 | 10/2006 | Biskeborn |
| 2007/0047146 A1 | 3/2007 | Biskeborn et al. |
| 2007/0242378 A1 | 10/2007 | Ikegami et al. |
| 2007/0285838 A1 | 12/2007 | Hennecken et al. |
| 2008/0068750 A1 | 3/2008 | Biskeborn et al. |
| 2008/0088963 A1 | 4/2008 | Biskeborn et al. |
| 2008/0137235 A1 | 6/2008 | Biskeborn et al. |
| 2008/0158720 A1 | 7/2008 | Watson |
| 2008/0192380 A1 | 8/2008 | Dee |
| 2008/0273258 A1 | 11/2008 | Berman et al. |
| 2008/0285167 A1 | 11/2008 | Biskeborn et al. |
| 2008/0291566 A1 | 11/2008 | Biskeborn et al. |
| 2009/0027803 A1 | 1/2009 | Biskeborn et al. |
| 2009/0128949 A1 | 5/2009 | Matsuno et al. |
| 2009/0135520 A1 | 5/2009 | Hachisuka |
| 2009/0174963 A1 | 7/2009 | Liang et al. |
| 2009/0213493 A1 | 8/2009 | Bui et al. |
| 2009/0219648 A1 | 9/2009 | Jaquette |
| 2009/0231756 A1 | 9/2009 | Koeppe |
| 2009/0231757 A1 | 9/2009 | Biskeborn et al. |
| 2009/0279205 A1 | 11/2009 | Hennecken |
| 2009/0316296 A1 | 12/2009 | Cherubini et al. |
| 2010/0073816 A1 | 3/2010 | Komori et al. |
| 2010/0110587 A1 | 5/2010 | Biskeborn et al. |
| 2011/0002065 A1 | 1/2011 | Dugas et al. |
| 2011/0051283 A1 | 3/2011 | Harper et al. |
| 2011/0170214 A1 | 7/2011 | Bui et al. |
| 2011/0182157 A1 | 7/2011 | Hoerger |
| 2011/0199701 A1 | 8/2011 | Bui et al. |
| 2011/0310511 A1 | 12/2011 | Edelman et al. |
| 2012/0008234 A1 | 1/2012 | Biskeborn et al. |
| 2012/0050909 A1 | 3/2012 | Lantz et al. |
| 2012/0200952 A1 | 8/2012 | Bui et al. |
| 2012/0206832 A1 | 8/2012 | Hamidi et al. |
| 2013/0286502 A1 | 10/2013 | Erden et al. |
| 2014/0016226 A1 | 1/2014 | Bui et al. |
| 2014/0036393 A1 | 2/2014 | Biskeborn et al. |
| 2014/0153127 A1 | 6/2014 | Kawabe et al. |
| 2014/0192435 A1 | 7/2014 | Buch |
| 2014/0327983 A1 | 11/2014 | Biskeborn et al. |
| 2014/0327984 A1 | 11/2014 | Biskeborn et al. |
| 2014/0327987 A1 | 11/2014 | Biskeborn et al. |
| 2014/0334033 A1 | 11/2014 | Biskeborn et al. |
| 2015/0043101 A1 | 2/2015 | Biskeborn et al. |
| 2015/0062742 A1 | 3/2015 | Biskeborn et al. |
| 2015/0077880 A1 | 3/2015 | Biskeborn et al. |
| 2015/0170691 A1 | 6/2015 | Biskeborn et al. |
| 2016/0012831 A1 | 1/2016 | Biskeborn et al. |

(56) References Cited

U.S. PATENT DOCUMENTS

2016/0012832 A1    1/2016    Biskeborn et al.
2016/0049166 A1    2/2016    Biskeborn et al.

FOREIGN PATENT DOCUMENTS

| | | |
|---|---|---|
| CN | 101202050 A | 6/2008 |
| EP | 0478276 A2 | 4/1992 |
| EP | 0883120 A1 | 12/1998 |
| EP | 0959454 A2 | 11/1999 |
| EP | 1030300 A2 | 8/2000 |
| EP | 1204096 A2 | 5/2002 |
| GB | 1516045 A | 6/1978 |
| JP | 2005108412 A | 4/2005 |
| JP | 2006172705 A | 6/2006 |
| JP | 2008146818 A | 6/2008 |
| JP | 5043615 B2 | 10/2012 |
| KR | 0183774 B1 | 4/1999 |
| WO | 2007093107 A1 | 8/2007 |
| WO | 2009141231 A2 | 11/2009 |
| WO | 2010047679 A1 | 4/2010 |
| WO | 2011067052 A1 | 6/2011 |

OTHER PUBLICATIONS

Beuch, We, "Magnetic Read Write Head Carriage Adjustment Procedure," IPCOM000071116D, Dec. 1, 1978, pp. 1-3.

Biskeborn et al., "2.4 Tape Head Technology," International Magnetic Tape Storage Roadmap, May 2012, pp. 107-128.

Cherubini et al., "Control Methods in Data Storage Systems," IEEE Transactions on Control Systems Technology, vol. 20, Issue 2, Mar. 2012, pp. 296-322.

Childers et al., "Six orders of magnitude in linear tape technology: The one-terabyte project," IBM Journal of Research & Development, vol. 47, No. 4, Jul. 2003, pp. 471-482.

Ditzel et al., "A Computer Method for the Automatic Reduction of Spectroscopic Data," Applied Optics, vol. 6, No. 12, Dec. 1967, pp. 2085-2090.

Goldade et al., "Tape edge study in a linear tape drive with single-flanged guides," Journal of Magnetism and Magnetic Materials, vol. 271, 2004, pp. 409-430.

Wright, A. E., "Effects of Operating Parameters on Lateral Tape Motion for Magnetic Tape in an Advanced Linear Tape Drive," Thesis, The Ohio State University, 2006, pp. 1-104.

International Search Report and Written Opinion from PCT Application No. PCT/IB2014/060706, dated Jan. 21, 2015.

Statement of Relevance of Non-Translated Foreign Document WO2007093107.

MINISKIRT TAPE HEAD HAVING QUASI-STATICALLY TILTED TRANSDUCER ARRAYS

BACKGROUND

The present invention relates to data storage systems, and more particularly, this invention relates to a magnetic head and system implementing the same, where the head includes a miniskirt design in combination with offset transducer arrays that are selectively tiltable relative to a magnetic medium.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as lateral tape motion transients and tape lateral expansion and contraction (e.g., orthogonal to the direction of tape travel) must be balanced with reader/writer sizes that provide acceptable written tracks and readback signals. One issue limiting areal density is misregistration caused by tape lateral expansion and contraction. Tape width can vary by up to about 0.1% due to expansion and contraction caused by changes in humidity, tape tension, temperature, aging etc. This is often referred to as tape dimensional instability (TDI).

If the tape is written in one environment and then read back in another, the TDI may prevent the spacing of the tracks on the tape from precisely matching the spacing of the reading elements during readback. In current products, the change in track spacing due to TDI is small compared to the size of the written tracks and is part of the tracking budget that is considered when designing a product. As the tape capacity increases over time, tracks are becoming smaller and TDI is becoming an increasingly larger portion of the tracking budget and this is a limiting factor for growing areal density.

SUMMARY

An apparatus according to one embodiment includes a magnetic head. The magnetic head has a first portion and a second portion, the first portion and the second portion together providing a tape bearing surface. The first portion has an opening at least partially encircling the second portion. The second portion has at least one array of transducers. A longitudinal axis of each of the at least one array is defined between opposite ends thereof. The longitudinal axis of each of the at least one array of transducers is oriented at an angle relative to a line oriented orthogonally to the intended direction of tape travel thereacross, the angle being between 0.2° and about 10°. The second portion has a first edge oriented at a second angle between 0.2° and about 10° relative to the line, and a second edge opposite the first edge, the second edge being oriented at a third angle between 0.2° and about 10° relative to the line.

An apparatus according to another embodiment includes a magnetic head. The magnetic head has a first portion and a second portion, the first portion and the second portion together providing a tape bearing surface. The first portion has an opening at least partially encircling the second portion. The second portion has at least one array of transducers. A longitudinal axis of each of the at least one array is defined between opposite ends thereof. The longitudinal axis of each of the at least one array of transducers is oriented at an angle relative to a line oriented orthogonally to an intended direction of tape travel thereacross, the angle being between 0.2° and about 10°. The opening of the first portion has an edge facing the second portion, the edge extending along a second angle between 0.2° and about 10°.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, in which a magnetic head incorporates a miniskirt design in combination with tilted arrays, as well as operation and/or component parts thereof. In various embodiments, the miniskirt design may allow for relative motion between portions of the tape supporting surface, thereby increasing the data read and/or write performance of some of the embodiments presented herein, as will be discussed in further detail below.

In one general embodiment, an apparatus includes a magnetic head. The magnetic head has a first portion and a second portion, the first portion and the second portion together providing a tape bearing surface. The first portion has an opening at least partially encircling the second portion. The second portion has at least one array of transducers. A longitudinal axis of each of the at least one array is defined between opposite ends thereof. The longitudinal axis of each of the at least one array of transducers is oriented at an angle relative to a line oriented orthogonally to the intended direction of tape travel thereacross, the angle being between 0.2° and about 10°.

In another general embodiment, an apparatus includes a magnetic head. The magnetic head has a first portion and a second portion, the first portion and the second portion together providing a tape bearing surface. The tape bearing surface has a generally arcuate cross sectional profile. The first portion has an opening at least partially encircling the second portion. The second portion has at least one array of transducers. A longitudinal axis of each of the at least one array is defined between opposite ends thereof. The longitudinal axis of each of the at least one array of transducers is oriented at an angle relative to a line oriented orthogonal to the intended direction of tape travel thereacross, the angle being between 0.2° and about 10°. The apparatus also includes a mechanism for orienting the second portion to control a transducer pitch presented to a tape, a drive mechanism for passing a magnetic medium over the magnetic head, and a controller electrically coupled to the magnetic head.

Figure 1A:
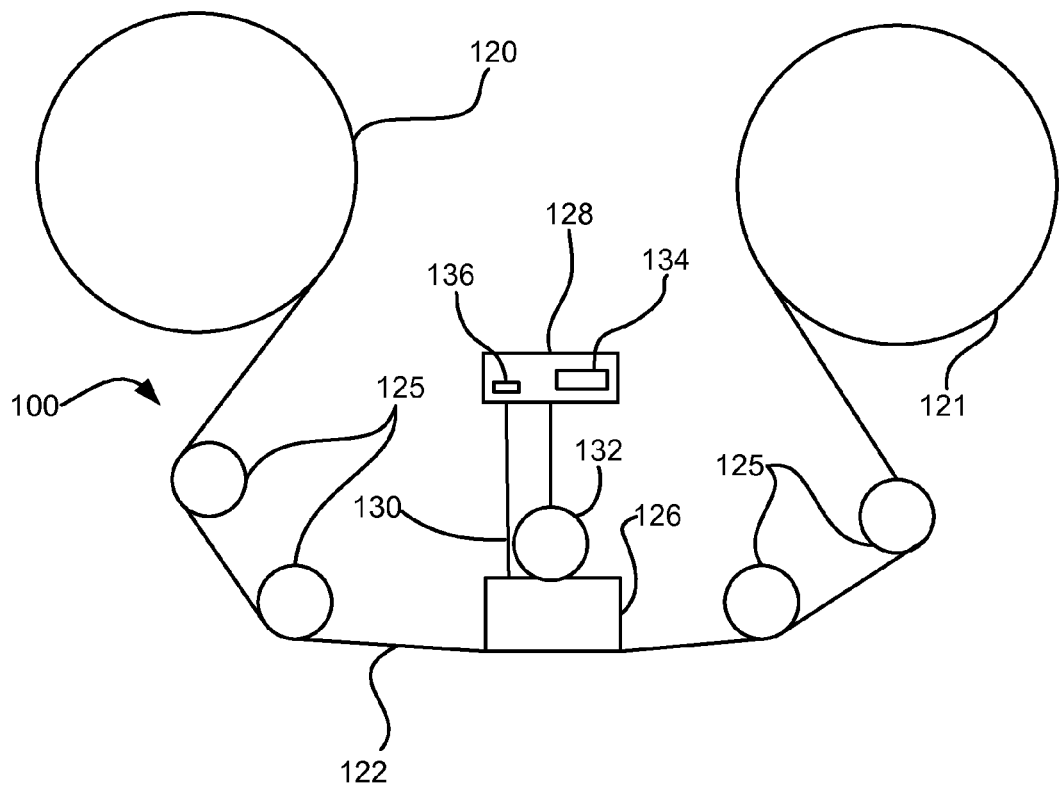
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
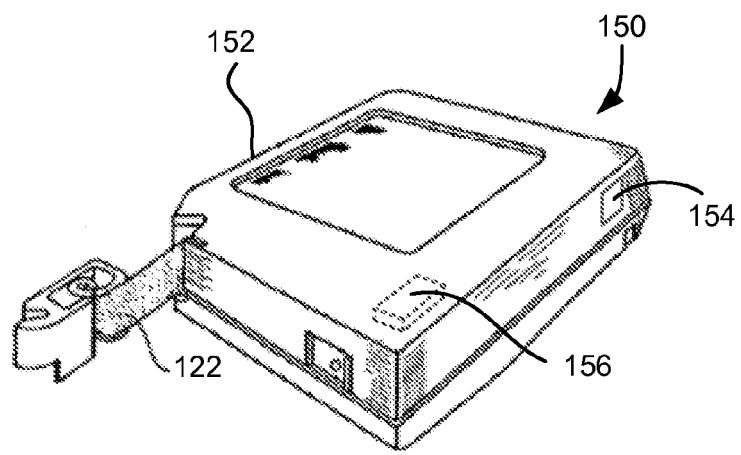
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
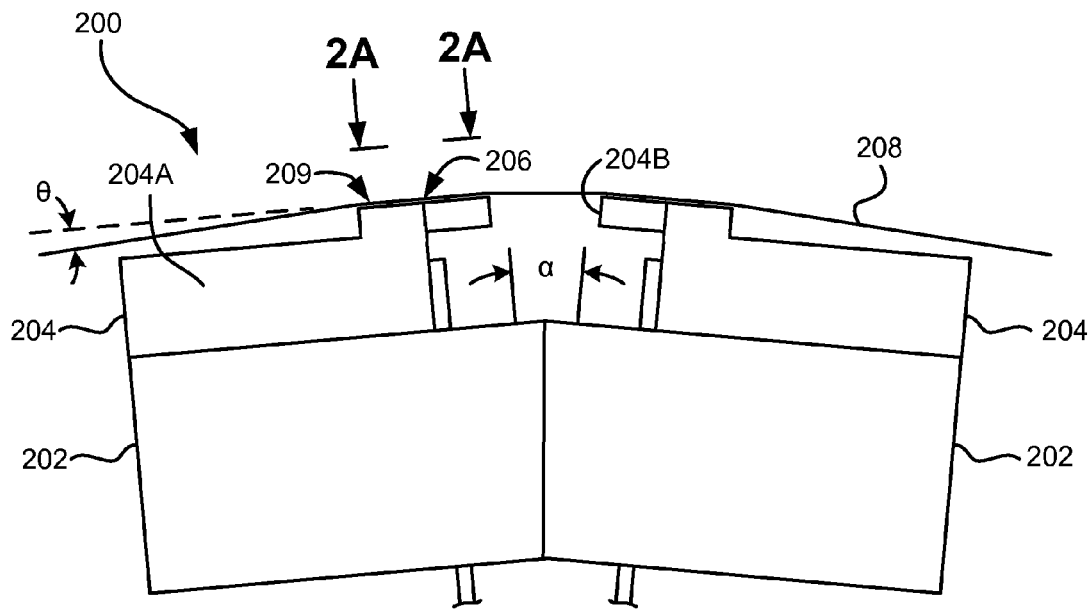
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
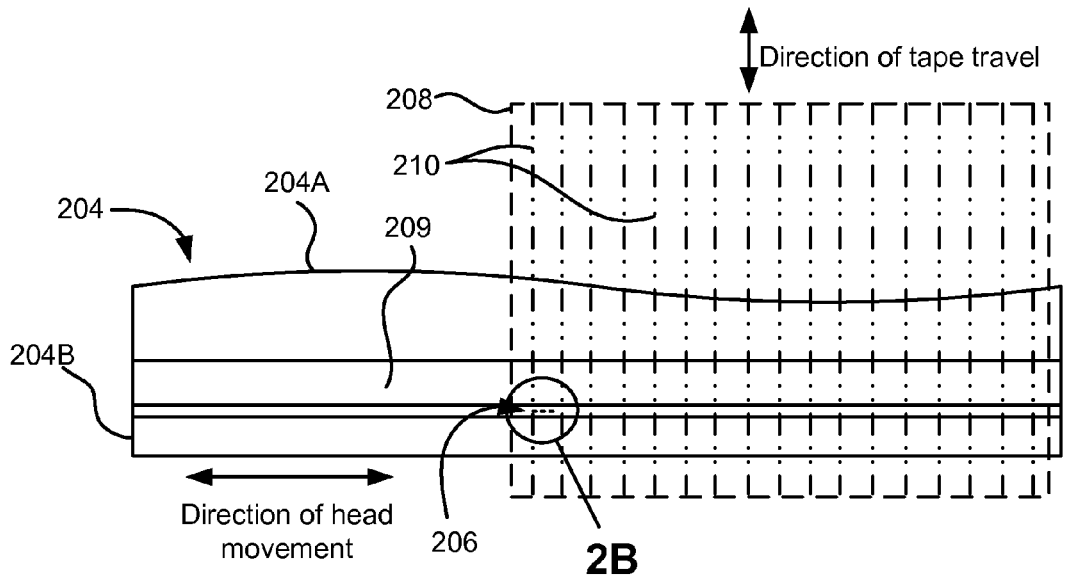
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
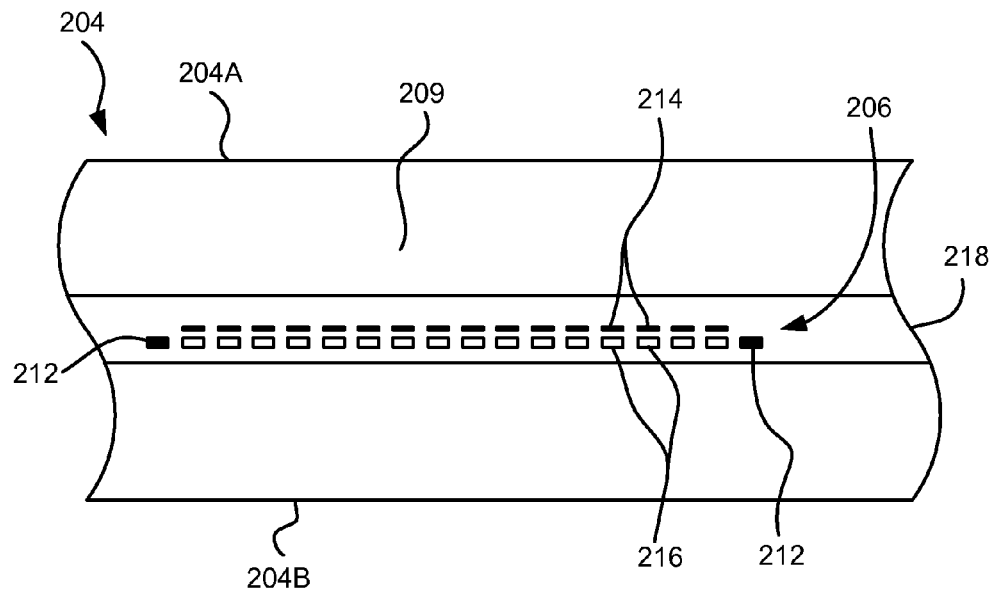
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
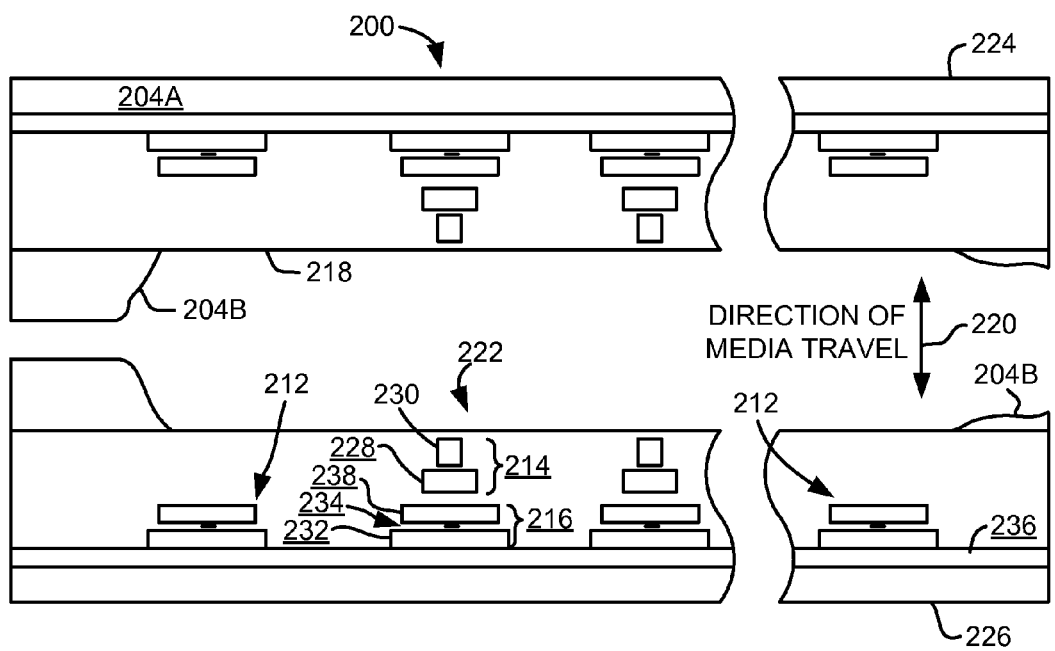
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally orthogonal to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
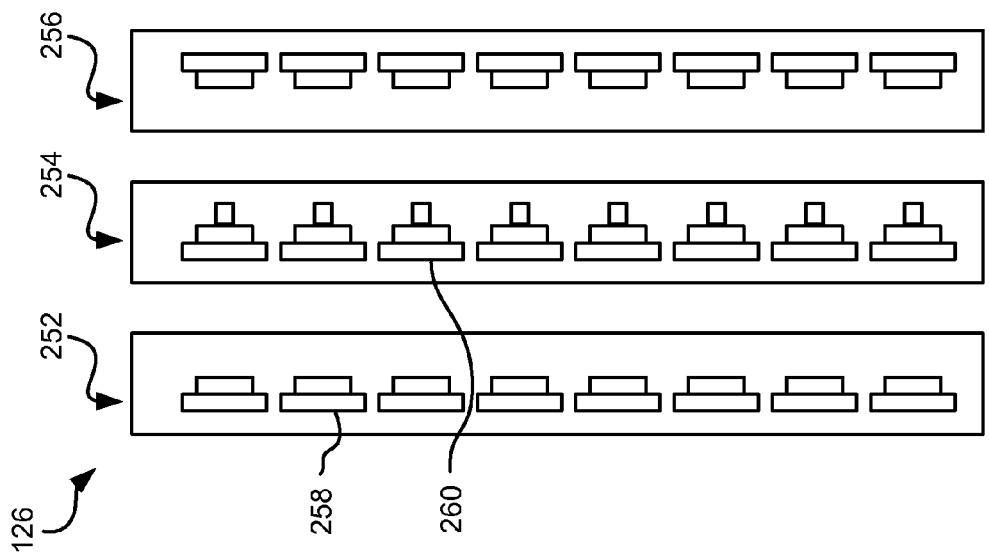
FIG. 4 is a partial tape bearing surface view of a magnetic head having a read-write-read configuration.
Figure 3:
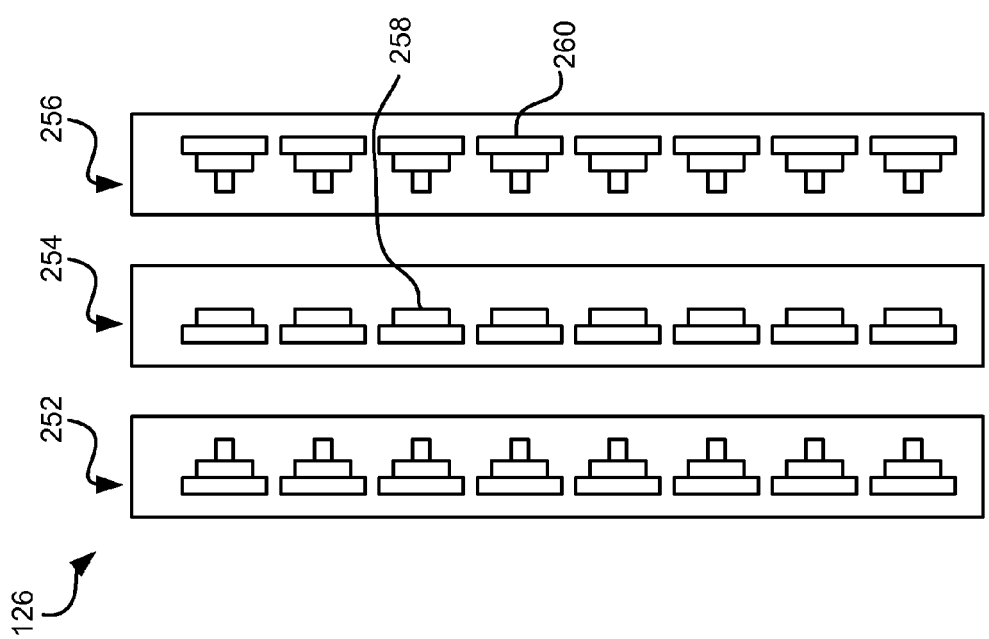
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
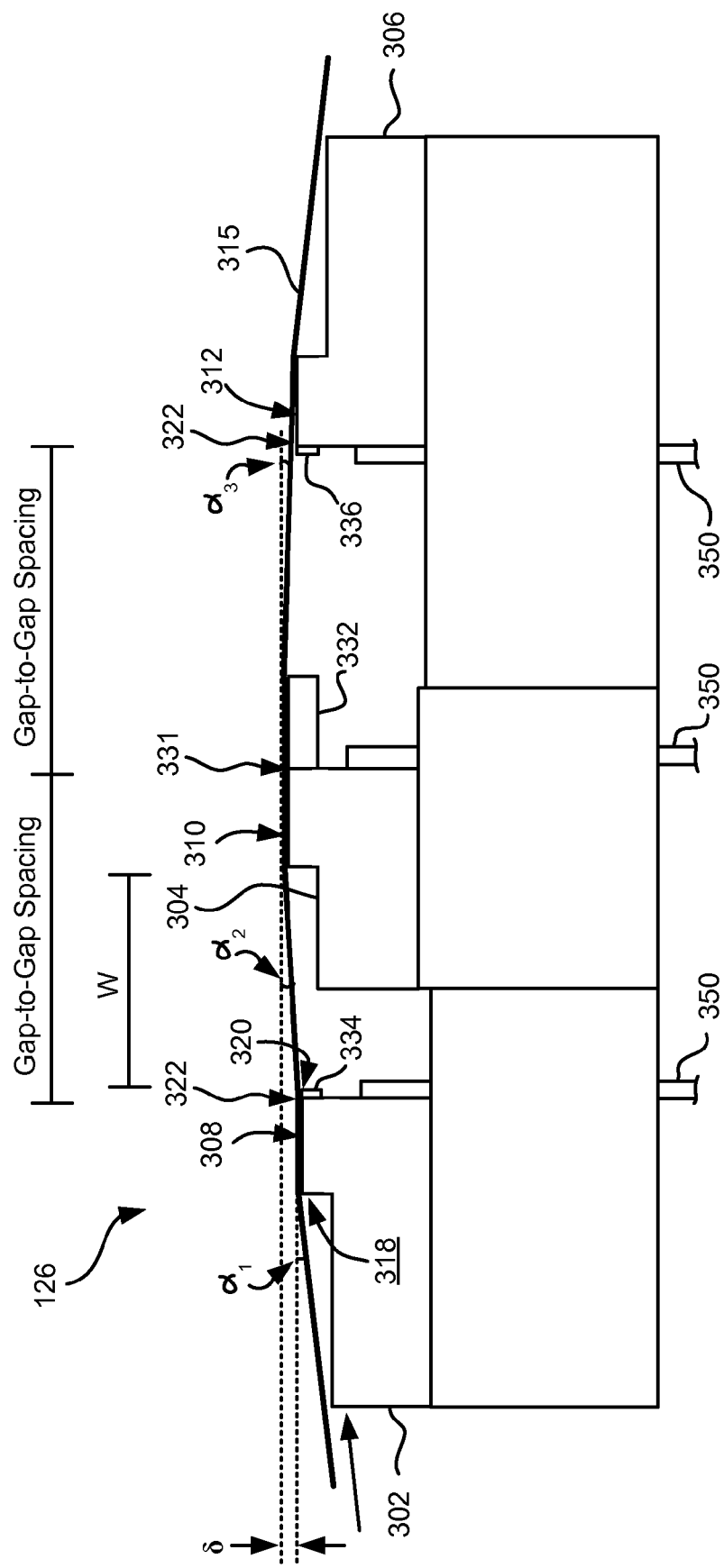
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
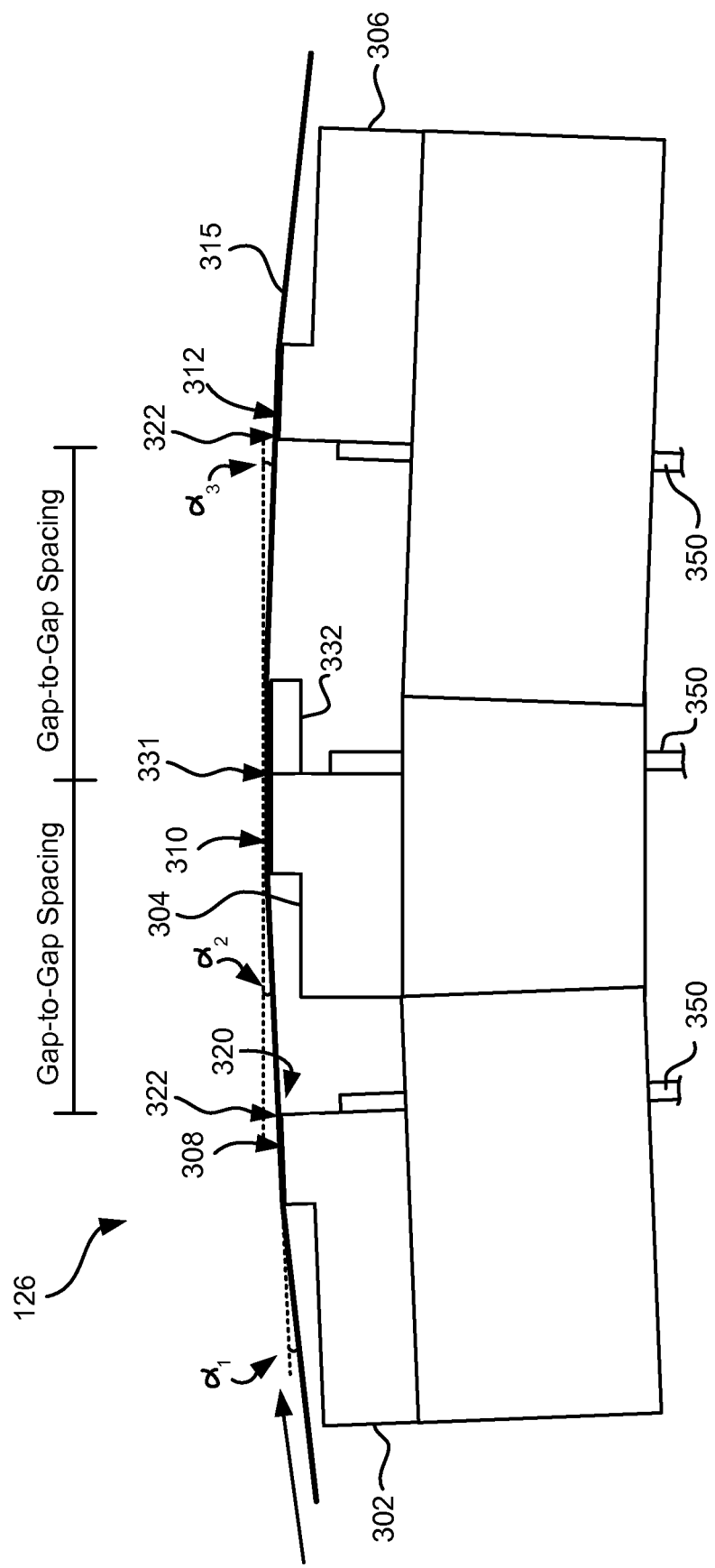
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle α2 of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle α2 of the second module 304. In other words, the planes of the tape bearing surfaces 308, 312 of the outer modules 302, 306 are oriented at about the desired wrap angle α2 of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
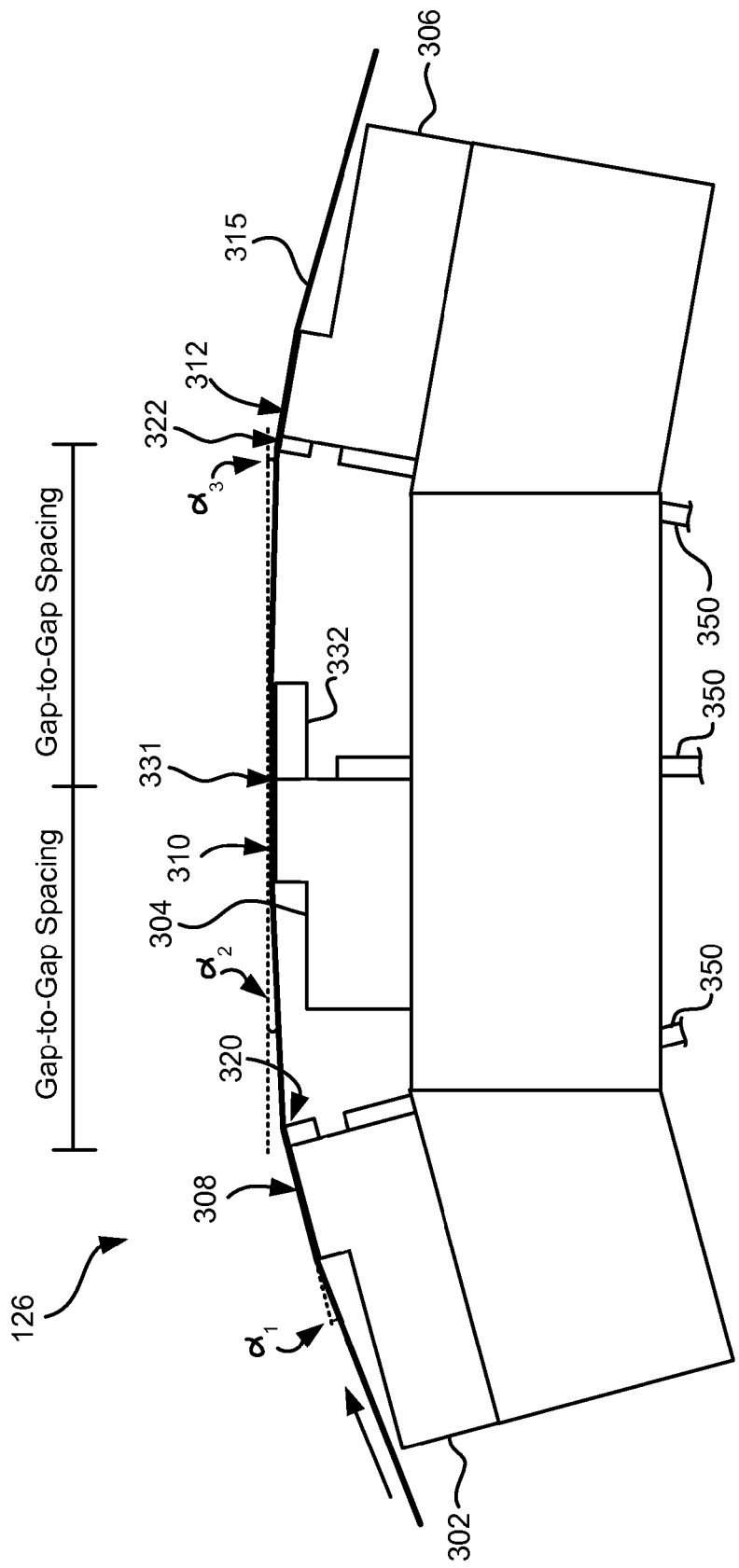
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle α2 relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles α1 may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle α1.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

As noted above, tape lateral expansion and contraction present many challenges to increasing data track density on conventional products. Conventional products have attempted to compensate for tape lateral expansion and contraction by controlling tape width by tension and improving the characteristics of the media itself. However, these methods fail to fully cancel the tape lateral expansion and contraction, and actually lead to other problems, including tape stretch and media cost increases, respectively.

Figure 8A:
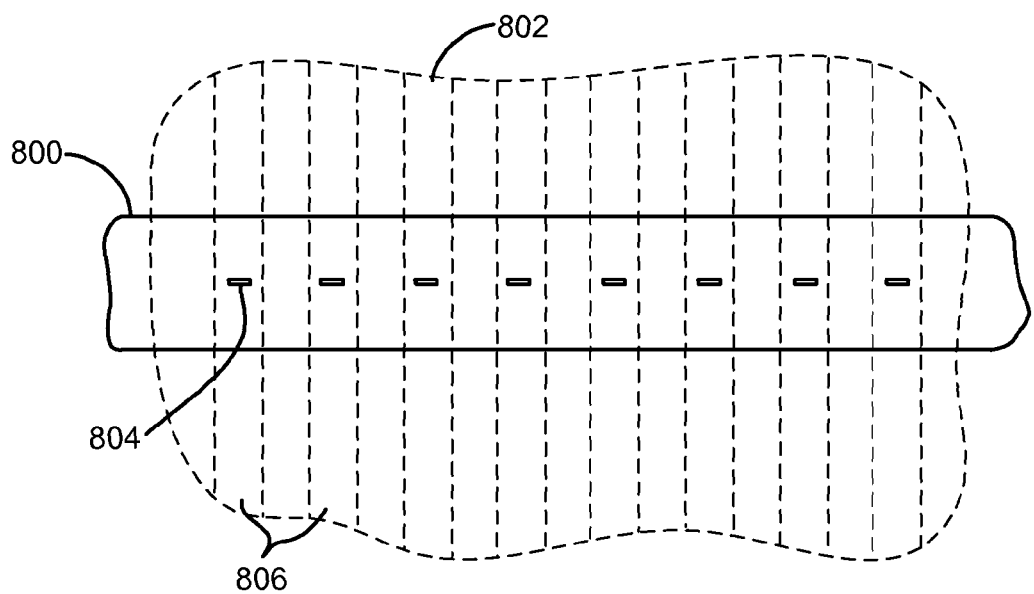
FIGS. 8A-8C are partial top-down views of one module of a magnetic tape head according to one embodiment.
Figure 8B:
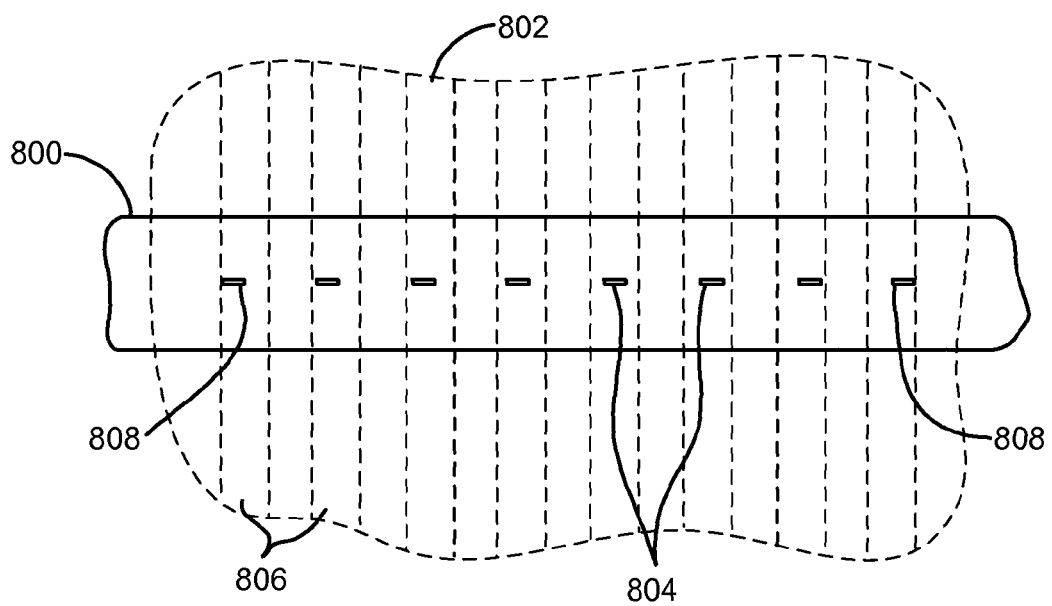
Figure 8C:
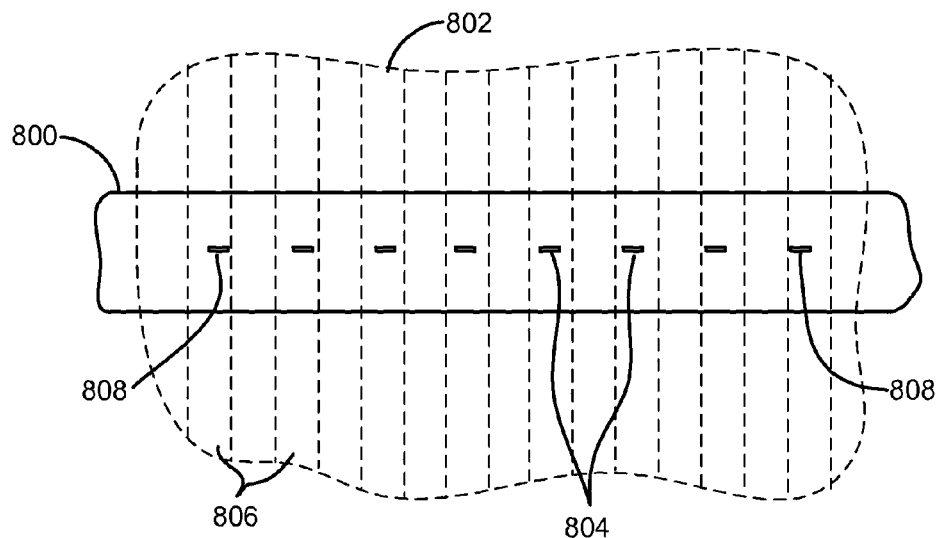

FIGS. 8A-8C are intended to depict the effect of tape lateral expansion and contraction on transducer arrays position relative thereto, and are in no way intended to limit the invention. FIG. 8A depicts a module 800 relative to the tape 802, where the tape has a nominal width. As shown, the transducers 804 are favorably aligned with the data tracks 806 on the tape 802. However, FIG. 8B illustrates the effect of tape lateral contraction. As shown, contraction of the tape causes the data tracks to contract as well, and the outermost transducers 808 are positioned along the outer edges of the outer data tracks as a result. Moreover, FIG. 8C depicts the effect of tape lateral expansion. Here expansion of the tape causes the data tracks to move farther apart, and the outermost transducers 808 are positioned along the inner edges of the outer data tracks as a result. If the tape lateral contraction is greater than that shown in FIG. 8B, or the tape lateral expansion is greater than that shown in FIG. 8C, the outermost transducers 808 will cross onto adjacent tracks, thereby causing the data stored on adjacent tracks to be overwritten during a writing operation and/or resulting in readback of the wrong track during a readback operation. Moreover, running effects, such as tape skew and lateral shifting may exacerbate such problems, particularly for tape having shingled data tracks.

Thus, it would be desirable to develop a tape drive system able to read and/or write tracks onto the tape in the proper position, regardless of the extent of tape lateral expansion and/or contraction at any given time. Various embodiments described and/or suggested herein overcome the foregoing challenges of conventional products, by orienting at least two modules of a tape drive system, such as by rotating, pivoting and/or tilting, thereby selectively altering the pitch of the transducers in their arrays, as will soon become apparent.

By selectively orienting a module, the pitch of the transducers on the module is thereby altered, preferably aligning the transducers with the tracks on a tape for a given tape lateral expansion and/or contraction. Tape contraction (shrinkage) can be dealt with by orienting a nominally non-offset head, but tape expansion (dilation) cannot. Thus, to accommodate both shrinkage and dilation about a "nominal," the head must be statically positioned at a nominal angle of at least approximately 0.2° as will be explained below. Thereafter, smaller angular adjustments (e.g., about 1° or lower, but could be more) may be made to the already-oriented module in order to compensate for any variation of the tape lateral expansion and/or contraction, thereby keeping the transducers aligned with tracks on the tape.

Figure 9A:
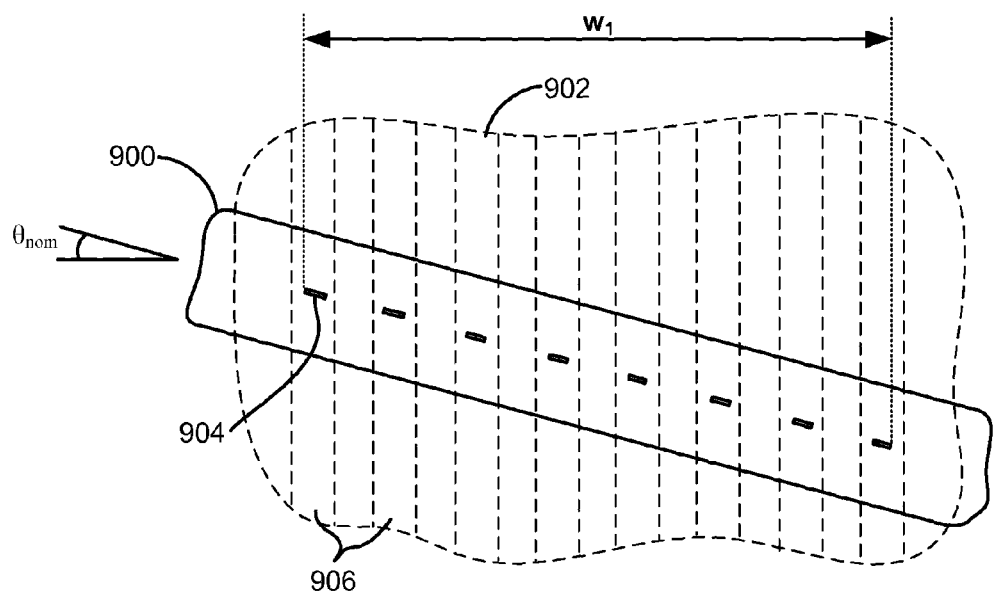
FIGS. 9A-9C are partial top-down views of one module of a magnetic tape head according to one embodiment.
Figure 9B:
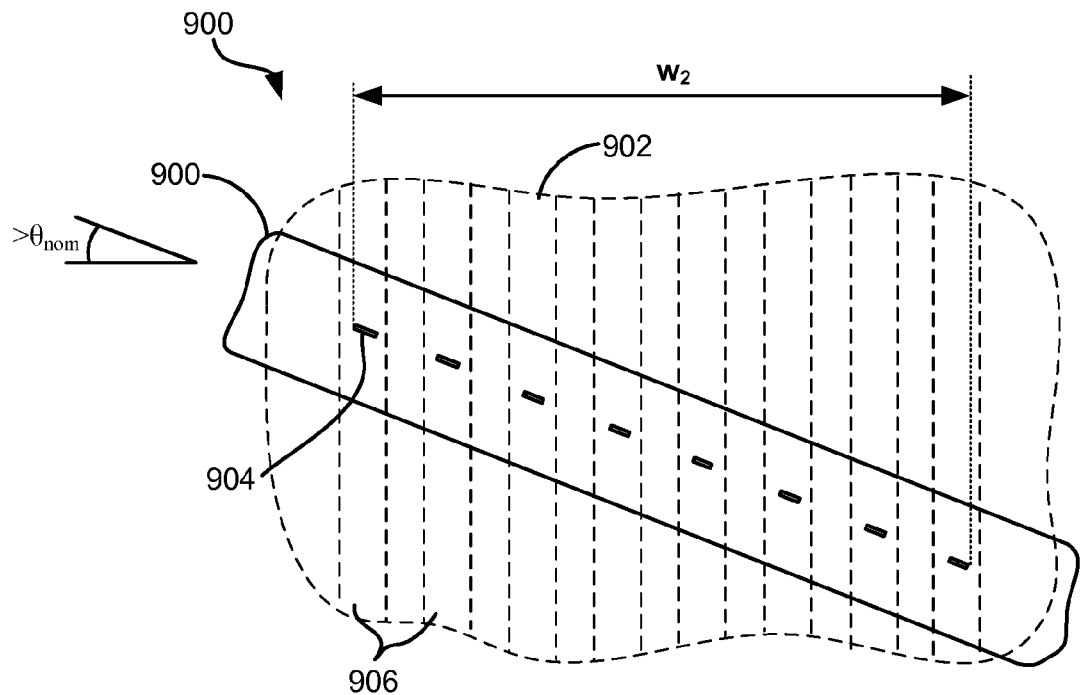
Figure 9C:
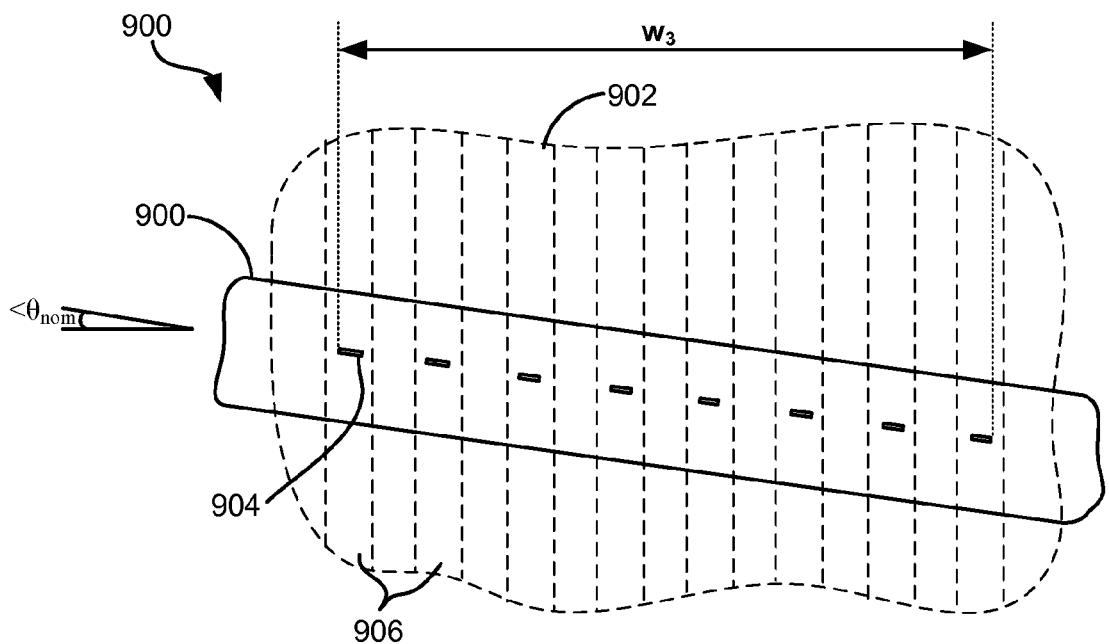

FIGS. 9A-9C illustrate representational views of the effects of orienting a module having transducer arrays. It should be noted that the angles of orientation illustrated in FIGS. 9A-9C are an exaggeration (e.g., larger than would typically be observed), and are in no way intended to limit the invention.

Referring to FIG. 9A, the module 900 is shown relative to the tape 902, where the tape has a nominal width. As illustrated, the module 900 is oriented at an angle $\theta_{nom}$ such that the transducers 904 are favorably aligned with the data tracks 906 on the tape 902. However, when the tape 902 experiences tape lateral contraction and/or expansion, the data tracks 906 on the tape contract and/or expand as well. As a result, the transducers on the module are no longer favorably aligned with the data tracks 906 on the tape 902.

In FIG. 9B, the tape 902 has experienced tape lateral contraction. Therefore, in a manner exemplified by FIG. 8B, the transducers 904 on the module 900 of FIG. 9B would no longer be favorably aligned with the data tracks 906 on the tape 902 if no adjustment were made. However, as alluded to above, smaller angular adjustments may be made to the already-oriented module 900 in order to compensate for tape lateral contraction. Therefore, referring again to FIG. 9B, the angle of orientation $>\theta_{nom}$ of the module 900 is further positioned at an angle greater than $\theta_{nom}$. By increasing the angle $>\theta_{nom}$ the effective width $w_2$ of the array of transducers decreases from the effective width $w_1$ illustrated in FIG. 9A. This also translates to a reduction in the effective pitch between the transducers, thereby realigning the transducers along the contracted data tracks 906 on the tape 902 as shown in FIG. 9B.

On the other hand, when the tape experiences tape lateral expansion, the data tracks on the tape expand as well. As a result, the transducers on the module would no longer be favorably aligned with the data tracks on the tape if no adjustments were made. With reference to FIG. 9C, the tape 902 has experienced tape lateral expansion. As a result, further angular adjustments may be made to the angle of orientation of the module in order to compensate for the tape lateral expansion. Therefore, referring again to FIG. 9C, the angle of orientation $<\theta_{nom}$ of the module 900 is reduced to an angle less than $\theta_{nom}$. By decreasing the angle of orientation $<\theta_{nom}$ the effective width $w_3$ of the array of transducers 904 increases from the effective width $w_1$ illustrated in FIG. 9A. Moreover, reducing the effective width of the array of transducers 904 also causes the effective pitch between the transducers to be reduced, thereby realigning the transducers along the data tracks 906 on the tape 902.

In some preferred embodiments, magnetic tape systems include two or more arrays of transducers, on one or more modules, where each array has multiple transducers typically arranged in a row. Depending on the desired embodiment, the multiple rows of transducers may allow the system to read verify during the write process, but is not limited thereto. As mentioned above, the foregoing conventional challenges may be overcome, e.g., by rotating a given module about an axis orthogonal to the plane in which its array resides (e.g., parallel to the plane of the tape bearing surface), thereby selectively altering the pitch of the transducers in the array as presented to tape. Moreover, similar effects may be achieved by changing the orientation of the array of transducers within the module itself according to another embodiment.

By providing a system that compensates for tape lateral expansion and/or contraction, various embodiments enable use of wider readers, resulting in a better signal to noise ratio (SNR), and/or smaller data tracks, thereby enabling in a higher capacity per unit area of the media.

Furthermore, a miniskirt design which may, for example, have independently positionable portions of a magnetic head, may be incorporated with any of the embodiments described herein. The miniskirt may provide a low running friction tape support surface that reduces friction compared to a conventional head. In addition, the miniskirt enables the use of smaller, lower mass modules (relative to a module that spans the entire tape width), and this in turn may provide higher track following performance.

The miniskirt design may preferably allow relative motion between portions of a magnetic head which together may provide a tape bearing surface. As described above, this may desirably increase the data read and/or write performance of various embodiments presented herein by improving compensation for tape skew; shifting (as detected using position error signal (PES) processing); TDI, e.g., lateral contraction and/or expansion, etc.; etc. Moreover, according to further embodiments, when paired with selectively tiltable data transducers as described above with reference to FIGS. 9A-9C, the miniskirt design may provide even greater improvements to data read and/or write performance, as will be explored in further detail below with reference to FIGS. 13A-15.

Furthermore, the miniskirt (referred to below as the "first portion") may reduce running friction, especially in embodiments where the miniskirt has an arcuate cross sectional profile, thereby promoting entrainment of air between the running tape and miniskirt.

Moreover, the miniskirt may reduce static friction, also known as stiction, especially where the tape bearing surface of the miniskirt has a surface roughness greater than 15 nm, e.g., 15-25 nm. The surface of the miniskirt may have a higher surface roughness than the tape bearing surface of a module having a transducer array.

Figure 10:
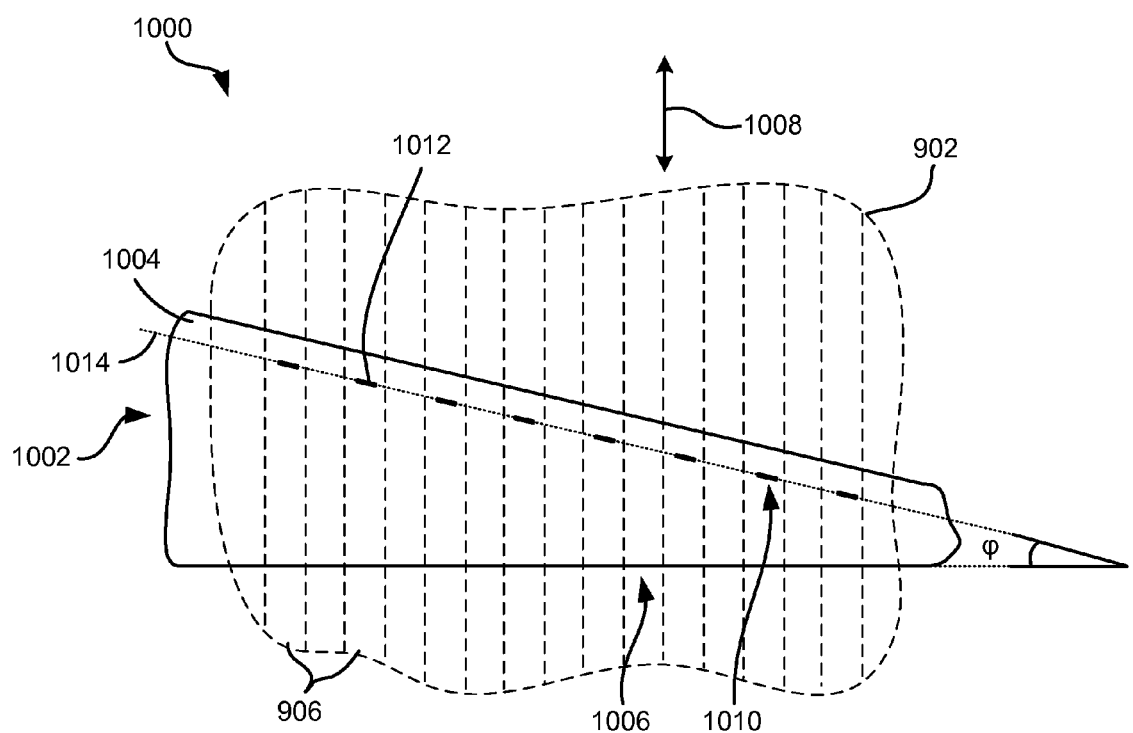
FIG. 10 is a partial top-down view of a module according to one embodiment.

Looking now to FIG. 10, an apparatus 1000 for compensating for tape lateral expansion and/or contraction is depicted in accordance with one embodiment. As an option, the present system 1000 may be implemented in conjunction with features from any other embodiment listed herein, such as those described with reference to the other FIGS. Of course, however, system 1000 and others presented herein may be used in various applications and/or in permutations which may or may not be specifically described in the illustrative embodiments listed herein. Further, the system 1000 presented herein may be used in any desired environment.

As illustrated in FIG. 10, an apparatus 1000 includes a magnetic head 1002. Moreover, the magnetic head 1002 has a tape bearing surface 1004 having a first edge 1006. According to one embodiment, the first edge 1006 may preferably be oriented about orthogonal to an intended direction 1008 of tape travel thereacross, but is not limited thereto depending on the desired embodiment (discussed in further detail below).

With continued reference to FIG. 10, the system further includes a canted array 1010 of transducers 1012 in and/or adjacent the tape bearing surface 1004, the array 1010 of transducers 1012 having a longitudinal axis 1014 that is oriented at an angle φ, relative to the first edge 1006. According to various embodiments, the angle φ may be between greater than about 0.2° and about 10°, but could be higher or lower e.g., to compensate for tape lateral expansion, skew, PES, etc., depending on the desired embodiment (discussed in further detail below). The angle φ preferably keeps the transducers 1012 within their respective data tracks 906 on the tape 902, e.g., at least for a nominal tape width. Moreover, small angular adjustments may additionally be made to the modules themselves to compensate for changing tape conditions as will soon become apparent.

Figure 11A:
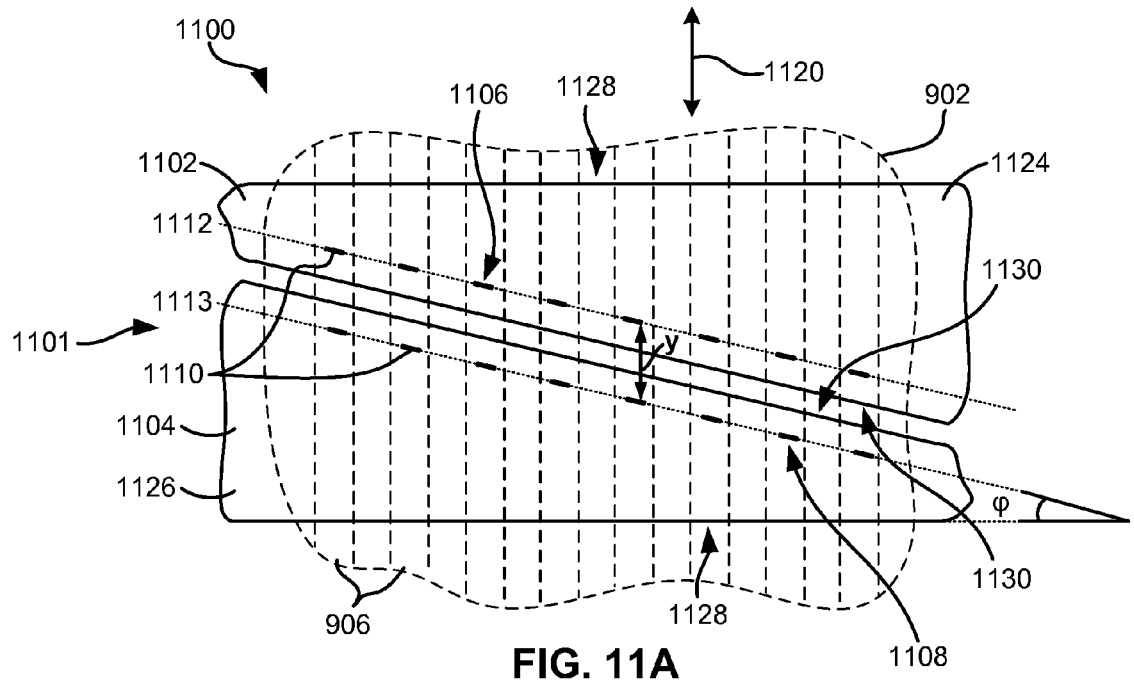
FIGS. 11A-11B are partial top-down views of an apparatus with two modules according to one embodiment.
Figure 11B:
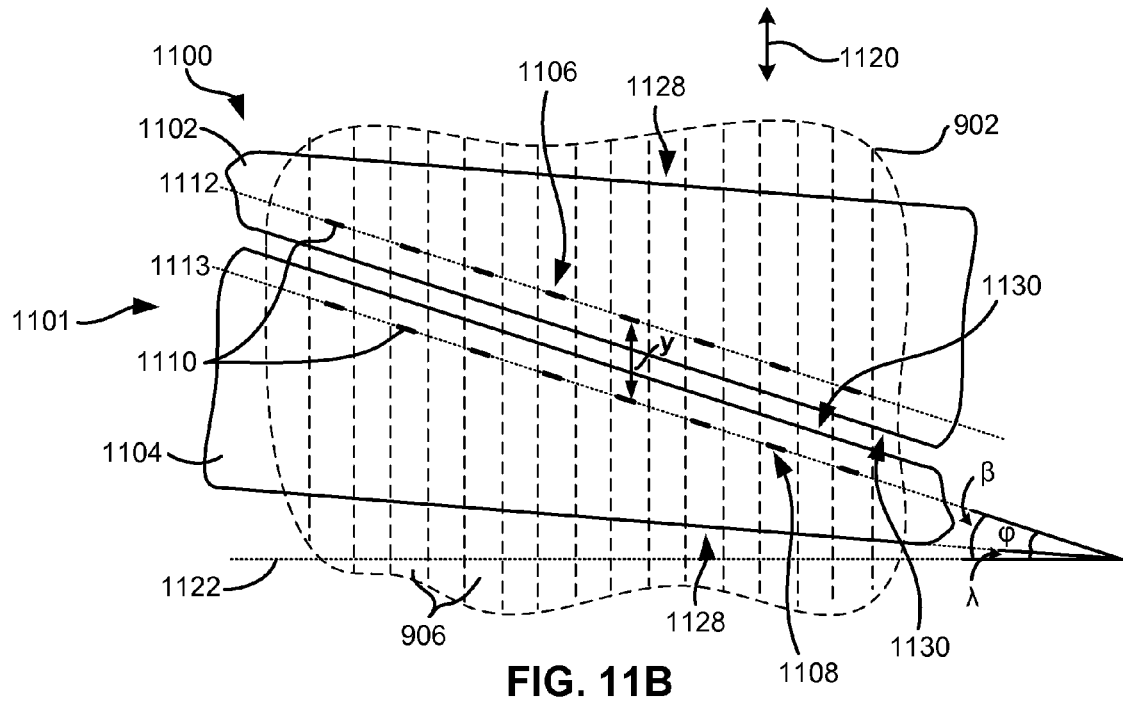
Figure 11C:
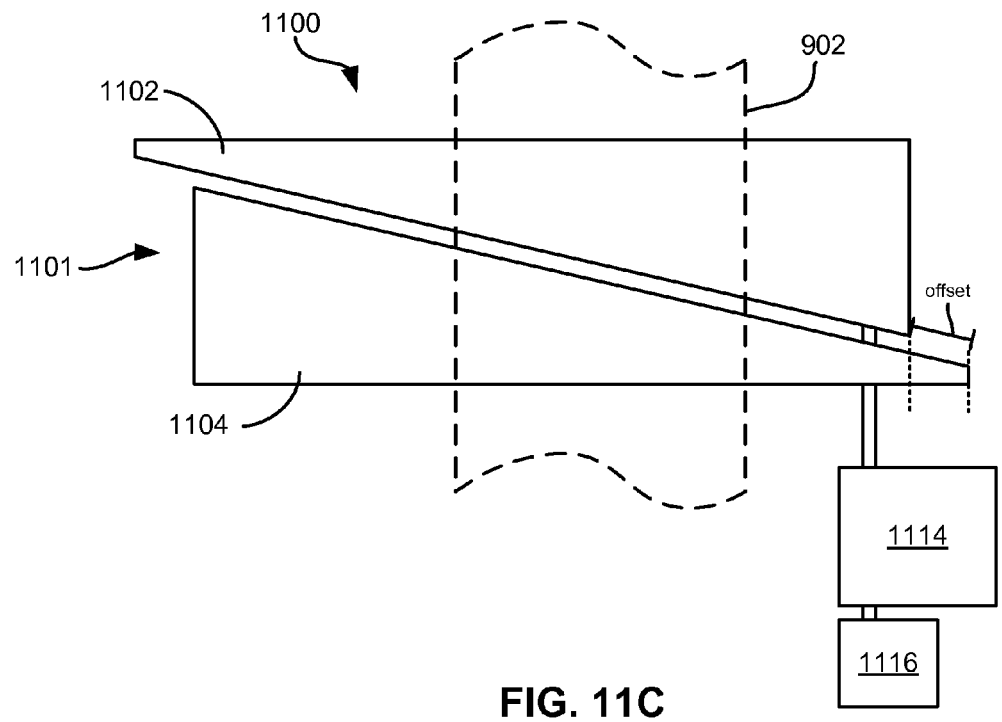
FIG. 11C is a diagram of the system of FIGS. 11A-11B.

FIGS. 11A-11C depict an apparatus and system 1100 to compensate for tape lateral expansion and/or contraction, in accordance with an illustrative embodiment having two modules. As an option, the present system 1100 may be implemented in conjunction with features from any other embodiment listed herein, such as those described with reference to the other FIGS. Of course, however, system 1100 and others presented herein may be used in various applications and/or in permutations which may or may not be specifically described in the illustrative embodiments listed herein. Further, the system 1100 presented herein may be used in any desired environment.

Referring to the illustrative embodiment depicted in FIGS. 11A-11C, the system 1100 includes a magnetic head 1101 which has two modules 1124, 1126. The magnetic head 1101 further includes a tape bearing surface 1102 and a second tape bearing surface 1104 spaced therefrom. As illustrated, each of the tape bearing surfaces 1102, 1104 have a first edge 1128, and a second edge 1130 opposite the first edge 1128. The transducers 1110 are arranged along longitudinal axes 1112 and 1113, extending between opposite ends of the associated array, and that are oriented at an angle from the first edge 1128 of the respective module. This configuration enables recording at a quasi-statically angle relative to the tape motion direction, and then making small corrections to that angle to cancel misregistration due to tape lateral dimensional changes, but with minimal steering forces on the tape. Steering forces may result when the tape wraps around a canted edge, particularly in the presence of friction, which can be high for smoother, modern high density tapes.

In a preferred embodiment, the first edge 1128 of the tape bearing surfaces 1102, 1104 is a skiving edge. This "skiving" edge serves to prevent air from being drawn into the gap between the tape bearing surface and the tape, so that atmospheric pressure pushes the tape into contact with the transducers. Even a small amount of rounding or slope at the first edge may generate an air bearing, separating the tape from the tape bearing surface, thereby reducing the achievable recording density due to spacing loss. Moreover, in other embodiments, a skiving edge may reduce tape steering, skew, etc. when in use. In some embodiments, before the tape passes over a first edge of the tape bearing surface, the tape may pass over an additional separated portion, or "outrigger," which favorably positions a tape to embodiment the skiving edge at a desirable wrap angle.

In a preferred embodiment, the first and second edges 1128, 1130 of the modules are of the same type (e.g., shape, texture, etc.) such that the tape tracks the same over the first edge of the tape bearing surface, as it does over the second edge of the tape bearing surface. This is particularly favorable when tape is run over a head bidirectionally, e.g., the first edge of a tape bearing surface may be the leading or trailing edge, depending on the desired direction of tape travel. This improves read and/or write accuracy, reduces noise, increases recording density, etc. However, in other embodiments the first and/or second edges of one or more of the modules may have a different shape, texture, etc. than one or more of the other first and/or second edges, depending on the desired embodiment.

With continued reference to FIGS. 11A-11C, the magnetic head 1101 has arrays 1106, 1108 of transducers 1110 in and/or adjacent the tape bearing surfaces 1102, 1104, respectively. As illustrated, the arrays 1106, 1108 of transducers are preferably longitudinally oriented at an angle φ relative to the first edge 1128 of the tape bearing surfaces 1102, 1104, respectively. As mentioned above, this angle φ preferably aligns the transducers within their respective data tracks 906 on the tape 902 e.g., when the modules are nominally oriented. According to various embodiments, the angle φ may be between greater than about 0.05° and about 10°, more preferably between greater than about 0.2° and about 10°, and ideally between greater than about 0.25° and about 4.5°, relative to the first edge 1128 of the tape bearing surfaces 1102, 1104, respectively. However, this angle is effectively established after the module is formed by any one or more of the methods described and/or suggested herein. Thus, selectively orienting the modules themselves is preferably conducted to compensate for different tape dimensions (explained in further detail below).

According to one embodiment, one or both the arrays of transducers may be in one or more chiplets, which may be thin film structures that are smaller than the module itself, and coupled thereto. A chiplet may include at least one of: a read transducer and a write transducer, or any combination thereof. Moreover, a chiplet is preferably coupled to a carrier, the carrier providing a portion of the tape bearing surface. In different embodiments, a chiplet may be coupled to the carrier using an adhesive, an electrostatically dissipative adhesive, or any other coupling mechanism which would be apparent to one skilled in the art upon reading the present description. Moreover, one or more of the chiplets may be longitudinally positioned about orthogonal to the intended direction of tape travel, or at an angle relative thereto. A chiplet may be an independently formed chip that was created separately and away from the carrier, or a chip formed on the carrier but not extending the full span of the magnetic tape passing thereacross.

In a further embodiment, one or more of the modules for a given head may be formed full span.

The arrays of transducers may be formed by known processes.

The first and/or second edges 1128, 1130 may be defined by any known process, such as dicing, lapping, polishing, etc.

With continued reference to FIGS. 11A-11C, the two modules 1124, 1126, are preferably fixed relative to each other. In view of the present description, "fixed" is intended to mean constrained from a directional movement relative to each other such that the arrays of each maintain a fixed position relative to each other. According to various embodiments, the tape bearing surfaces may be fixed relative to each other by using brackets, fasteners, adhesives, cables, a common support structure, etc. Moreover, according to different embodiments, the tape bearing surfaces are preferably fixed relative to each other prior to being installed in the system 1100, head, etc. depending on the desired embodiment.

The two modules 1124, 1126, are preferably fixed such that the first and second edges 1128, 1130 of tape bearing surface 1102, are oriented about parallel to the first and second edges 1128, 1130 of tape bearing surface 1104, respectively. Therefore, the first edge 1128 for both tape bearing surfaces 1102, 1104, may be oriented about orthogonal to an intended direction 1120 of tape travel thereacross.

In a preferred embodiment, the modules are fixed such that the distance between the arrays of transducers in a direction parallel to the intended direction of tape travel is minimized. Reducing the spacing between the transducers in a direction parallel to the intended direction of tape travel improves the recording quality for a given system, e.g., by reducing noise while reading and/or writing, minimizing the effects of tape skew thereby keeping the transducers within their respective data tracks, etc. Therefore, with continued reference to FIGS. 11A-11C, the distance y between the arrays 1106, 1108 of transducers 1110 may be minimized. As shown, the second edge 1130 of both tape bearing surfaces 1102 and 1104 is preferably oriented about parallel to the longitudinal axes 1112, 1113 of the arrays 1106, 1108 of transducers 1110. In one embodiment, the module may be formed with the second edge oriented about parallel to the arrays of transducers, e.g., by using grinding, masking, lapping, etc. According to various other embodiments, second edge may first be formed about orthogonal to the direction of tape travel (see FIG. 12), and then cut, etched, ground, etc., about parallel to the arrays 1106, 1108 of transducers 1110. In yet other embodiments, the distance between arrays is made larger to accommodate writers having narrower widths.

With continued reference to FIGS. 11A-11C, the second edge 1130 of tape bearing surface 1102 and the second edge 1130 of tape bearing surface 1104 are preferably positioned adjacent each other. This favorably allows the modules 1124, 1126 to be positioned such that the arrays 1106, 1108 of transducers 1110 may be closer together in a direction parallel to the intended direction of tape travel.

Figure 12:
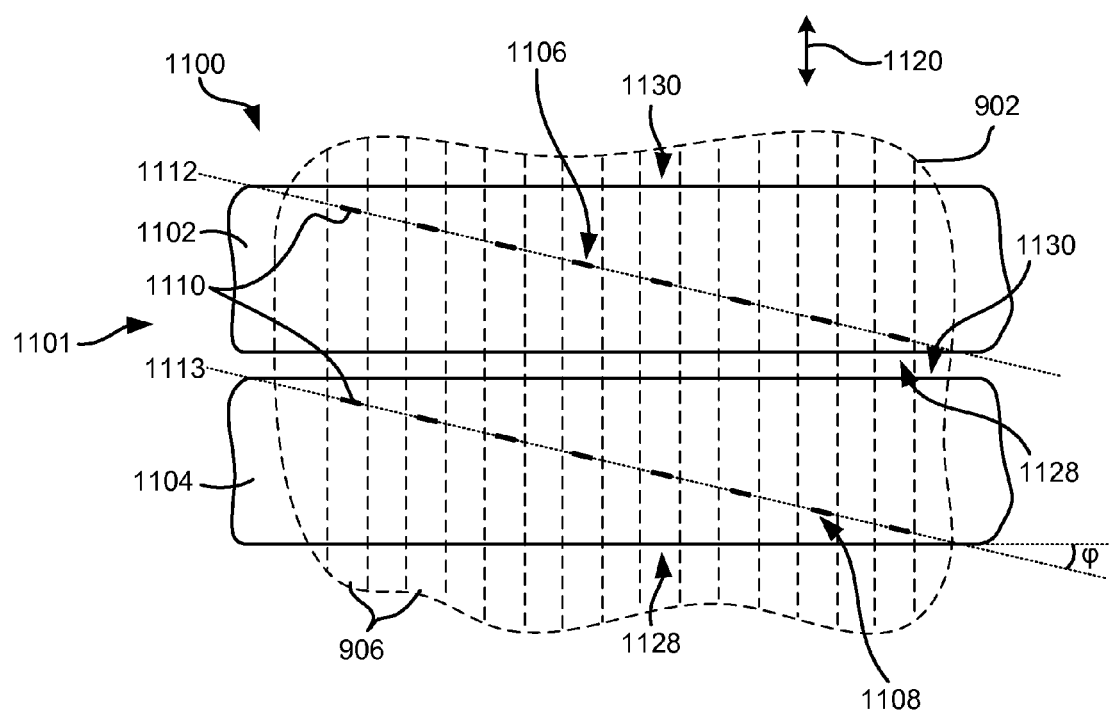
FIG. 12 is a partial top-down view of an apparatus with two modules according to one embodiment.

However, according to another embodiment, which is in no way intended to limit the invention, the second edge 1130 for one or both the tape bearing surfaces 1102, 1104 may be oriented about parallel to the first edge 1128 of one or both the tape bearing surfaces 1102, 1104. As illustrated in FIG. 12, the second edges 1130 are oriented about parallel to the first edges 1128 of both the tape bearing surfaces 1102, 1104, which are also oriented about orthogonal with the intended direction of tape travel.

Moreover, referring again to FIGS. 11A-11C, the modules 1124, 1126, are preferably fixed such that the axes 1112, 1113 of the arrays 1106, 1108 are oriented about parallel to each other. As shown, the axes 1112, 1113 of each array of transducers are defined by the dashed lines that lie between opposite ends thereof, e.g., the ends positioned farthest apart. However, the modules are preferably selectively orientable (e.g., rotatable or tiltable) as a single structure about a pivot point while remaining fixed relative to each other, as will soon become apparent.

As referred to above, the modules may be set to a nominal angle in the drive so that the transducers of the arrays are preferably aligned along the data tracks 906 of a tape 902 having nominal tape conditions (see $\theta_{nom}$ of FIG. 9A). As illustrated in FIG. 11A, the modules are preferably oriented such that the first edge 1128 of the modules is nominally oriented about orthogonal to an intended direction 1120 of tape travel thereacross. However, in other embodiments, the first and/or second edge 1128, 1130 of the modules of FIG. 11A may be nominally oriented orthogonally to an intended direction 1120 of tape travel thereacross. Moreover, the first and/or second edges 1128, 1130 of the modules may be nominally oriented at an angle relative to a direction orthogonal to the intended direction of tape, depending on the desired embodiment.

According to different embodiments, the first and or second edges 1128, 1130 may be set to a nominal orientation when a new tape is loaded, when the tape is stopped, when a read and/or write operation is initiated, etc. However, once the tape no longer has nominal conditions, e.g., the tape begins to run; fluctuations in tape skew, tape lateral expansion or contraction is present, PES, etc.; etc., the modules may be selectively oriented from the nominal orientation, such that the transducers are preferably kept within the data tracks of the tape for the present conditions. This follows the reasoning presented above in relation to FIGS. 9A-9C illustrating one method of compensating for different tape characteristics.

In one embodiment, which is in no way intended to limit the invention, the modules may be oriented from the nominal angle to a desired angle during read and/or write operation. Accordingly, the modules may be oriented during run time to compensate for fluctuating conditions, e.g., tape skew, PES variations, etc. In different embodiments, the modules may be selectively oriented periodically; upon request; instantaneously; when a limit is reached e.g., a time limit, tape lateral contraction, tape lateral expansion, etc.; etc., depending on the desired embodiment.

Referring again to FIGS. 11A-11B, the arrays 1106, 1108 of the transducers 1110 in the first and second modules 1124, 1126 are preferably longitudinally oriented at an angle φ relative to the first edge of the air bearing surfaces, as described above. As illustrated in FIG. 11B, although the angle φ between the array of transducers and first edge of the tape bearing surface is fixed, the modules themselves may be selectively oriented to an angle λ, in relation to a reference line 1122 orthogonal to the intended direction of tape travel. Moreover, the modules may rotate about a pivot point which may be located in various locations relative to the head, depending on the desired embodiment.

With continued reference to FIG. 11B, the modules may be selectively oriented such that the combined angular difference β between the reference line 1122 and the axes 1112, 1113 of the arrays 1106, 1108 of transducers 1110 (i.e., φ+λ=β) is within a preferred range. According to various embodiments, the preferred range is between greater than about 0.05° and about 10°, more preferably between greater than about 0.2° and about 8°, and ideally between greater than about 0.25° and about 6°, relative to the first edge 1128 of the tape bearing surfaces 1102, 1104, respectively, to compensate for tape lateral expansion, skew, PES, etc.

Angles of orientation greater than within the specified range (e.g., greater than about 10°) may be undesirable as the higher angles may cause steering of the tape when used. However, as described above, the angles of orientation within the specified range unexpectedly and unforeseeably have been found via experimentation to not result in steering of the tape. Moreover, it is more difficult to distinguish between skew and tape lateral expansion and/or contraction when angles of orientation of the tape bearing surfaces are greater than within the specified range. This may cause difficulties when matching the dimensional conditions of the tape and/or orientation of the tape bearing surfaces of the current operation to that of the previous operation (explained in further detail below). It should also be noted that the angles $\phi$, $\lambda$ illustrated in FIGS. 11A-11B are exaggerated (e.g., larger than within the desired range), and are in no way intended to limit the invention.

Depending on the desired embodiment, the modules themselves may also be offset to effect the shifting of the transducer arrays, e.g., as shown by the offset (offset) in FIG. 11C. Alternatively, the transducer arrays and/or chiplets may be positioned on the respective module in a specified position to effect the offset while the modules themselves are not offset in the drive; or combinations thereof.

With continued reference to FIG. 11C, the system 1100 includes a mechanism 1114, such as a tape dimensional instability compensation mechanism for orienting the head 1101 to control a transducer pitch presented to a tape. In another embodiment, the tape dimensional instability compensation mechanism 1114 may oriented the modules to control the transducer pitch presented to a tape. The tape dimensional instability compensation mechanism 1114 preferably allows for the orienting of the tape bearing surfaces to be done while the modules are reading and/or writing. The tape dimensional instability compensation mechanism 1114 may be any known mechanism suitable for orienting the modules. Illustrative tape dimensional instability compensation mechanisms 1114 include worm screws, voice coil actuators, thermal actuators, piezoelectric actuators, etc.

The system 1100 further includes a controller 1116. In one embodiment, the controller 1116 may be configured to control the tape dimensional instability compensation mechanism 1114 for orienting the modules based on a physical and/or running state of the tape, e.g., lateral expansion and/or contraction, skew, PES, etc. According to various embodiments, the state of expansion of the tape may be based on a readback signal of the tape, e.g., servo signals, data signals, a combination of both, etc. In another embodiment, the dimensional conditions of the tape and/or orientation of the modules when the tape was written may be retrieved e.g., from a database, cartridge memory, etc., and the orientation thereof may be set based thereon to about match the transducer pitch of the current operation to that of the previous operation.

In various embodiments, additional logic, computer code, commands, etc., or combinations thereof, may be used to control the tape dimensional instability compensation mechanism 1114 for adjusting the orientation of the modules based on a skew of the tape. Moreover, any of the embodiments described and/or suggested herein may be combined with various functional methods, depending on the desired embodiment.

Figure 11D:
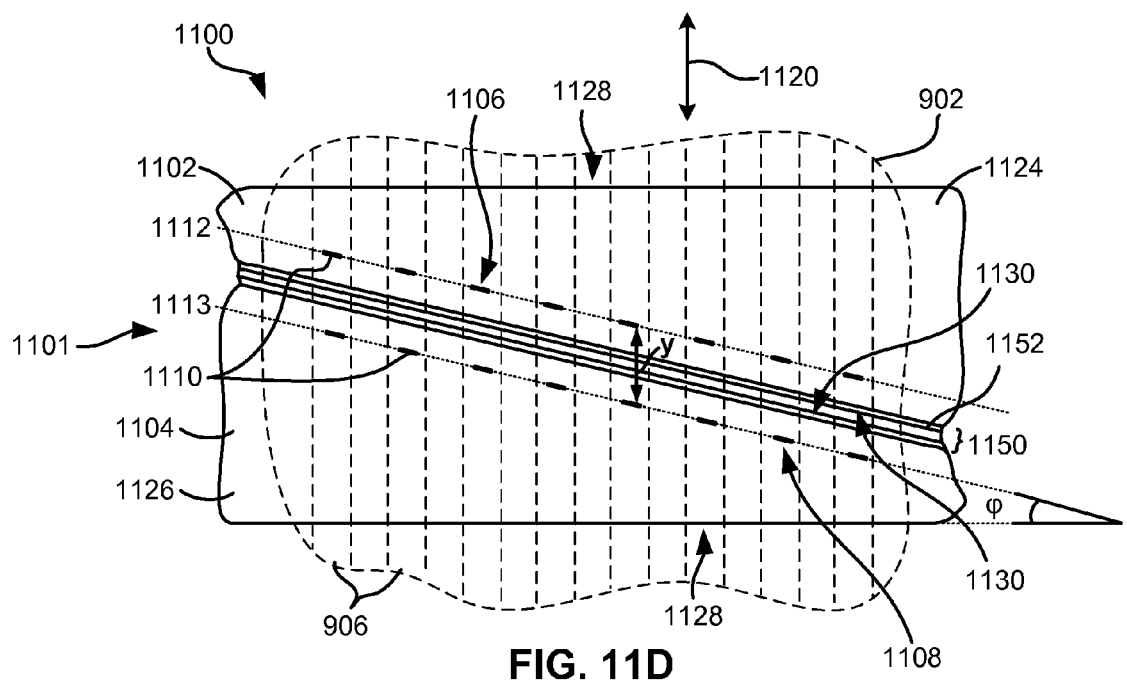
FIG. 11D is a partial top-down view of an apparatus with two modules according to one embodiment.

FIG. 11D depicts a variation of an apparatus as shown in FIG. 11A, and like elements are numbered the same in both FIGS. Referring to FIG. 11D, a spacer member 1150 extends between the second edges 1130 of the tape bearing surfaces. The spacer member 1150 may be recessed from a plane of the tape bearing surfaces, but is preferably coplanar therewith and/or otherwise forms a portion of the overall tape bearing surface of the head.

In one embodiment, the spacer member 1150 includes an electro-magnetic shield 1152 for shielding the array of transducers from the second array of transducers. Such shield may be formed of any suitable material known in the art, such as NiFe, CoFe, copper, aluminum, etc. and combinations thereof. The shield may extend from the tape bearing surface, or some point therebelow, in a height direction (into the tape bearing surface), preferably for a distance that provides the desired shielding effect. For example, the shield may have a height similar to that of shields of the transducers.

Although two modules are illustrated in FIGS. 11A-11D, in other embodiments, an apparatus or system may include any number of modules e.g., at least two, at least three, at least four, a plurality, etc. depending on the desired embodiment. Moreover, the modules may be positioned with any orientation relative to other modules of the system, depending on the desired embodiment.

As alluded to above, a miniskirt design may be incorporated with any of the embodiments described herein, thereby allowing relative motion between portions of a magnetic head, in some embodiments, which together may provide a tape bearing surface. As previously described, this may increase the data read and/or write performance of various embodiments presented herein, e.g., by improving compensation for tape skew, position error signal (PES), TDI, etc. Moreover, according to further embodiments, when paired with selectively tiltable arrays of data transducers e.g., as described above with reference to the embodiments in FIGS. 10-11D, a miniskirt design may provide even greater improvements to data read and/or write performance.

Figure 13A:
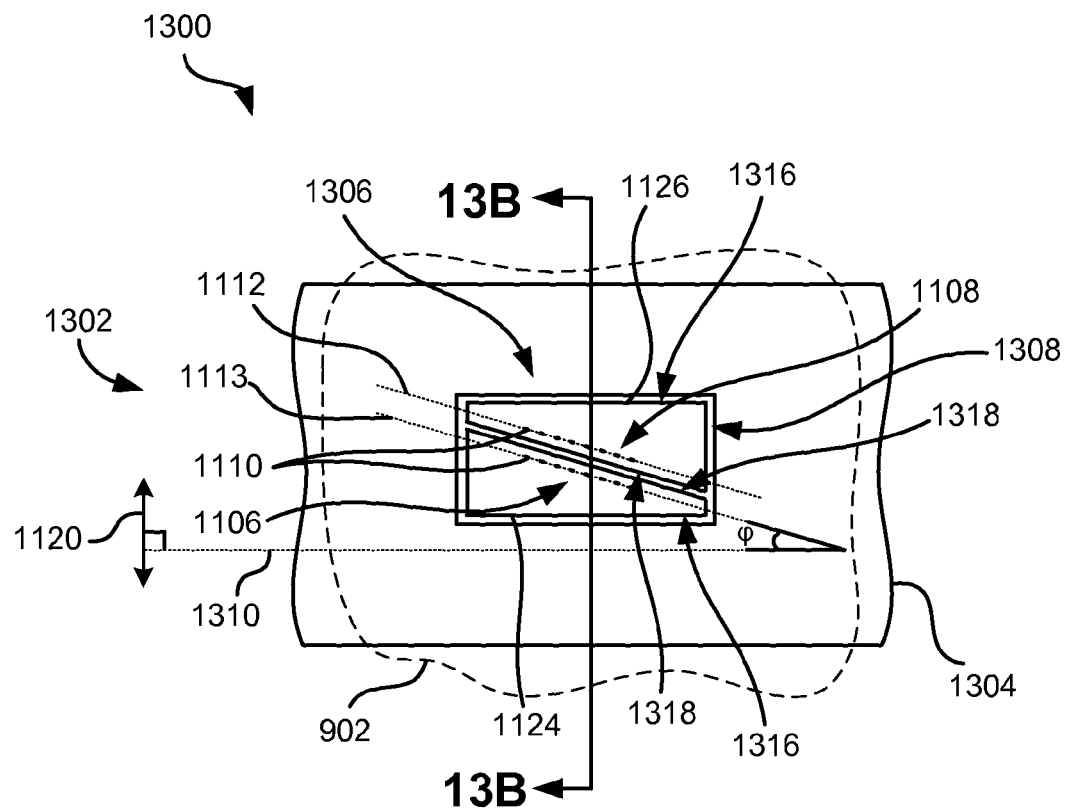
FIG. 13A is a partial top-down view of an apparatus having two portions according to one embodiment.
Figure 13B:
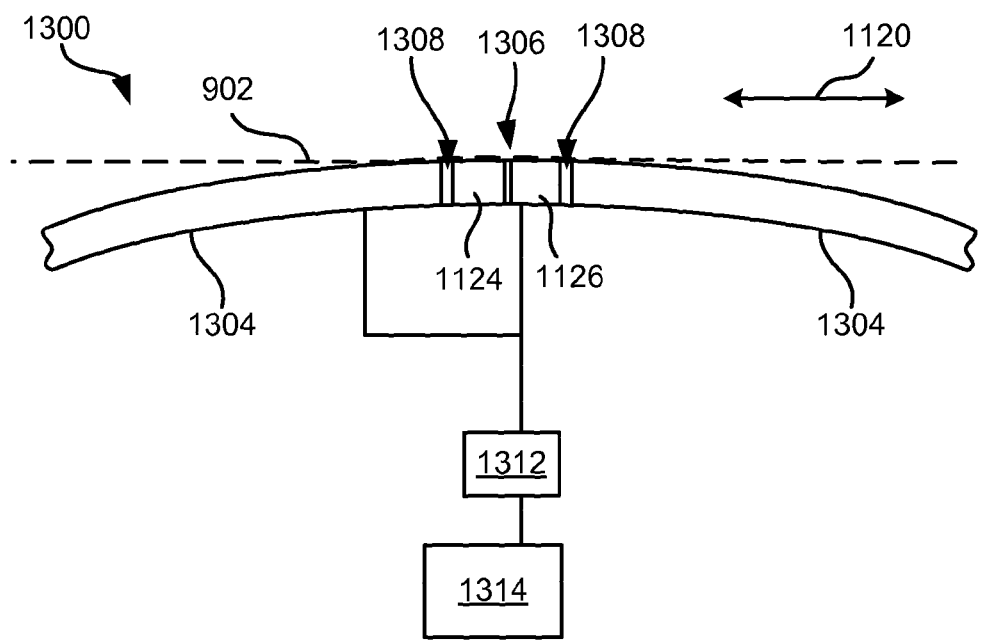
FIG. 13B is a partial cross-sectional view of the embodiment shown in FIG. 13A taken along line 13B-13B.

Referring now to FIGS. 13A-13B, the embodiments depicted therein illustrate an apparatus 1300, in accordance with one embodiment. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment. Thus FIGS. 13A-13B (and the other FIGS.) should be deemed to include any and all possible permutations.

Looking to FIGS. 13A-13B, the apparatus 1300 includes a magnetic head 1302 which has a first portion 1304 and a second portion 1306, e.g., which form a miniskirt-head assembly. In a preferred embodiment, the first portion 1304 and a second portion 1306 together provide a tape bearing surface (TBS). However, according to further embodiments, the magnetic head 1302 may include additional lips, outriggers, portions, etc. which may add to the surface area of the TBS, e.g., to support a wider range of tape sizes.

Figure 14:
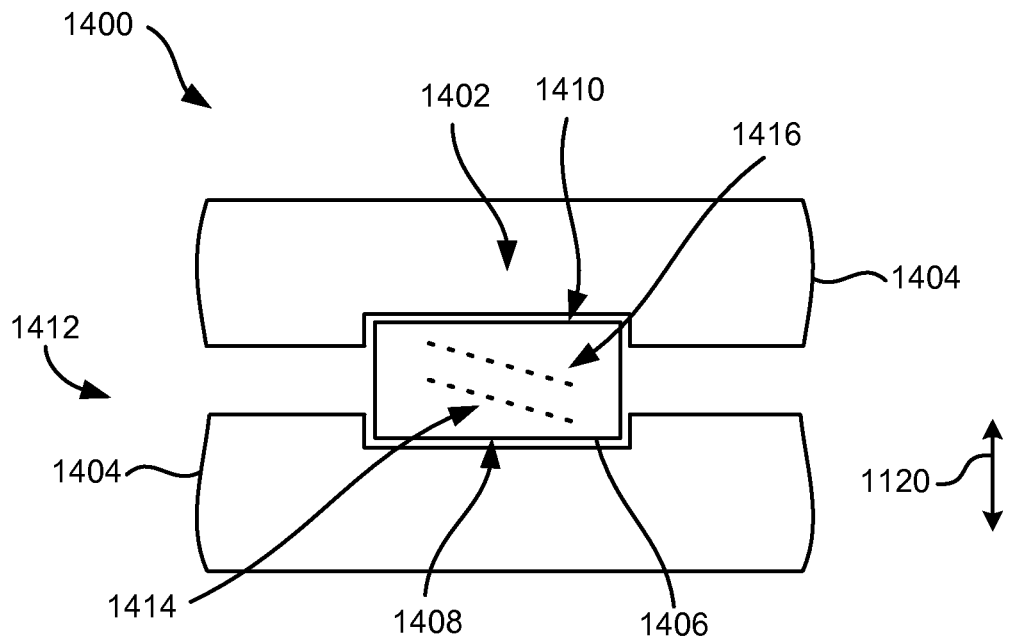
FIG. 14 is a partial top-down view of an apparatus having two portions according to one embodiment.
Figure 15:
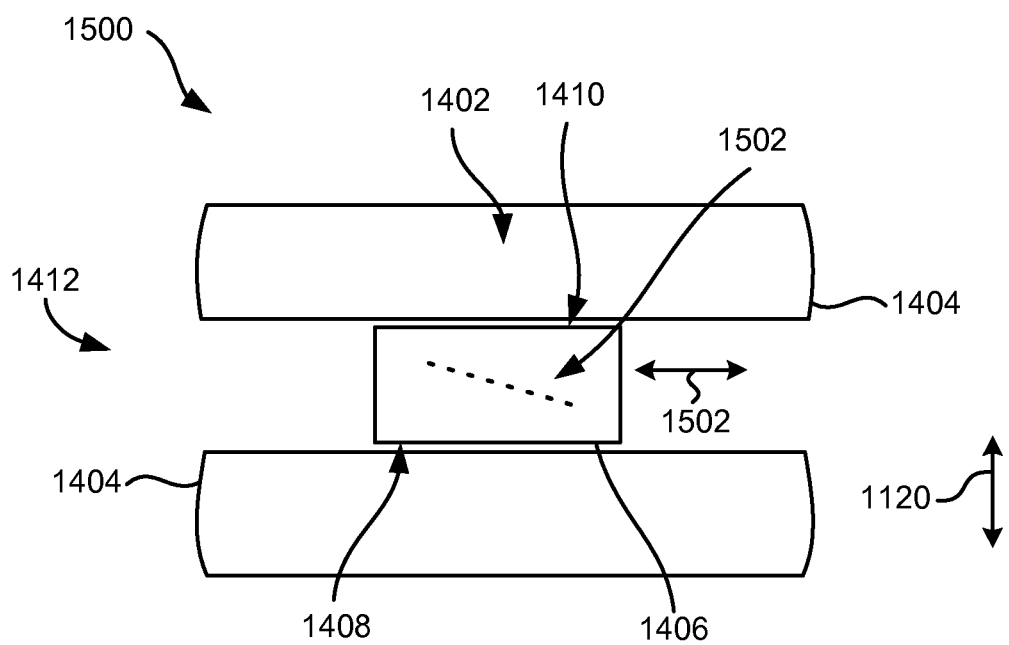
FIG. 15 is a partial top-down view of an apparatus having two portions according to one embodiment.

Additionally, the first portion 1304 of the magnetic head 1302 has an opening 1308 which may at least partially encircle the second portion 1306. According to the illustrative embodiment depicted in FIGS. 13A-13B and 16, the opening 1308 may fully encircle the second portion 1306; however, in other embodiments, the opening 1308 of the first portion 1304 may incorporate different designs and therefore may only partially encircle the second portion 1306, as shown in FIGS. 14-15.

With continued reference to FIGS. 13A-13B, the second portion 1306 is depicted as including two modules 1124, 1126. It should be noted that various components of FIGS. 13A-13B have common numbering with those of FIGS. 11A-11D, thereby signifying components having similar and/or the same designs as those described above. It follows that the modules 1124, 1126 of the second portion 1306 may include any of the embodiments described above with reference to FIGS. 11A-11D, depending on the desired embodiment. Thus, according to one embodiment, each of the modules 1124, 1126 of the second portion 1306 in FIGS.

13A-13B include an array 1106, 1108 of transducers 1110, respectively. However, according to other embodiments, the second portion 1306 may include at least one array of transducers, as described in detail below with reference to FIGS. 14-15.

Still looking to FIGS. 13A-13B, the modules 1124, 1126 of the second portion 1306 each have a first edge 1316, and a second edge 1318 opposite the first edge 1316. As depicted, the first edge 1316 is oriented orthogonally to the intended direction 1120 of tape travel while the second edge 1318 is oriented about parallel to the arrays of transducers 1106, 1108. However, according to another illustrative embodiment, the first and second edges 1316, 1318 may both be oriented about parallel to the arrays of transducers 1106, 1108, as described in detail below with reference to FIG. 16.

Similar to the description provided above, the second portion 1306 as illustrated in FIGS. 13A-13B, has two arrays 1106, 1108 of transducers 1110. Furthermore, the arrays 1106, 1108 of transducers 1110 have longitudinal axes 1112, 1113 respectively, which are defined between opposite ends thereof. The longitudinal axes 1112, 1113 of the arrays 1106, 1108 are oriented about parallel to each other such that a first of the arrays 1106 is offset from the second of the arrays 1108 in a direction parallel to the axes 1112, 1113 of the arrays. According to a preferred embodiment, the arrays may be offset enough such that at least some of the transducers 1110 of the first array 1106 are about aligned with at least some of the transducers 1110 of the second array 1108 in an intended direction 1120 of tape travel thereacross. This preferably allows for the transducers of both arrays to align with the data tracks of a tape being read and/or written to. Moreover, this configuration enables read verified writing of data, thereby desirably reducing write errors, data loss, etc.

Moreover, the arrays 1106, 1108 of transducers 1110 are positioned in a canted configuration, such that the longitudinal axis 1112, 1113 of each of the arrays 1106, 1108 are oriented at an angle φ relative to a line 1310 oriented orthogonally to the intended direction 1120 of tape travel thereacross. According to various embodiments, the angle φ may be between greater than about 0.2° and about 10°, but could be higher or lower e.g., to compensate for tape lateral expansion, skew, PES, etc., depending on the desired embodiment. Furthermore, according to various embodiments, the orientation of the arrays 1106, 1108 of transducers 1110 and/or the orientation of the modules 1124, 1126 may include any of the embodiments as discussed in detail above with reference to FIGS. 10-12.

Figure 16:
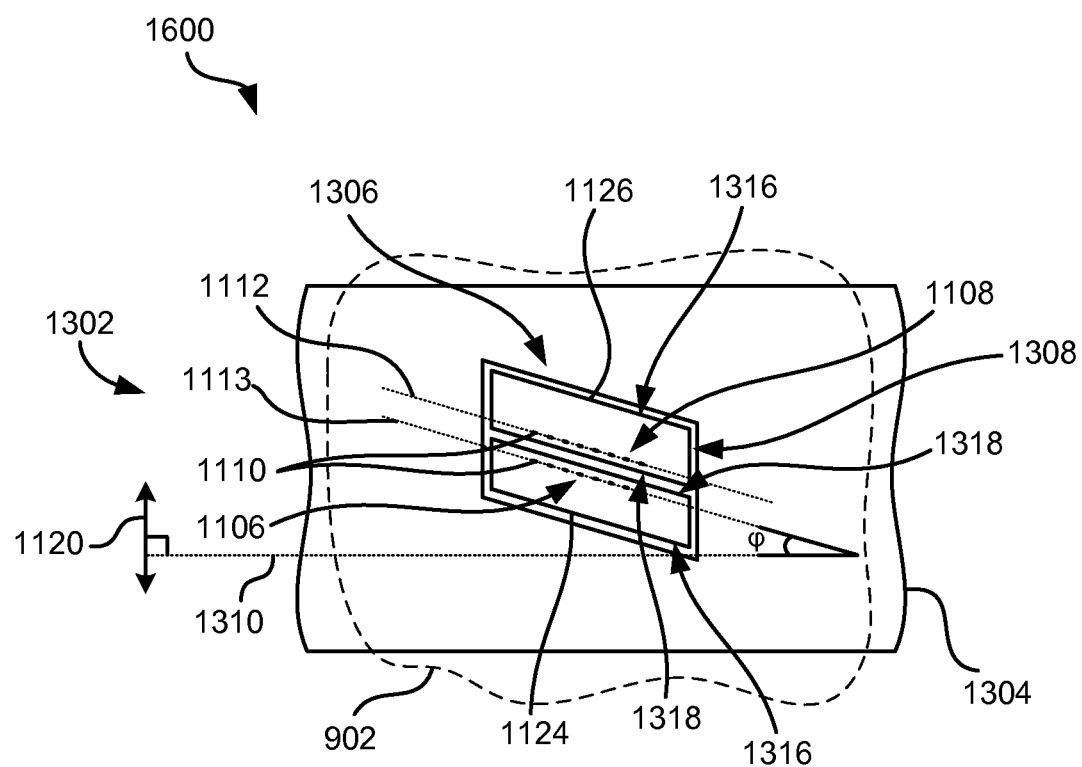
FIG. 16 is a partial top-down view of an apparatus having two portions according to one embodiment.

According to yet another embodiment, FIG. 16 illustrates an apparatus 1600 having modules 1124, 1126 positioned such that the first and second edges 1316, 1318 of each of the modules 1124, 1126 are oriented about parallel to the arrays of transducers 1106, 1108. Additionally, the arrays of transducers 1106, 1108 may be oriented at an angle φ relative to a line 1310 oriented orthogonally to the intended direction 1120 of tape travel thereacross. Thus, the first and second edges 1316, 1318 of each of the modules 1124, 1126 may be oriented at an angle φ relative to the line 1310 as well. It should be noted that various components of FIG. 16 have common numbering with those of FIGS. 13A-13B, thereby signifying components having similar and/or the same designs as those described above.

In preferred embodiments, the angle φ keeps the transducers 1110 within their respective data tracks on the tape 902, e.g., at least for a nominal tape width. Moreover, small angular adjustments may additionally be made to the modules themselves to compensate for changing tape conditions as previously described. However, with continued reference to the apparatus 1300 of FIGS. 13A-13B, the first portion 1304 and/or second portion 1306 may be selectively positionable depending on the desired embodiment, e.g., to achieve the small angular adjustments to compensate for changing tape conditions, while minimizing power consumption, run time, accuracy, etc., as will soon become apparent.

Looking now to the partial cross-sectional view of FIG. 13B, the apparatus 1300 has a mechanism 1312 for orienting the first and/or second portions 1304, 1306, e.g., to control a transducer pitch presented to a tape. Therefore, according to different embodiments, the mechanism may be able to compensate for TDI, tape skew and/or track following of only the first portion, only the second portion, or both the first and second portions, depending on the configuration of the apparatus. Preferably, by controlling the transducer pitch presented to a tape, the mechanism 1312 may be able to compensate for TDI, and tape skew, while adjustments may also be made to the orientation of the transducers in a direction orthogonal to the intended direction 1120 of tape travel to allow for track following. Furthermore, the mechanism may include any of the embodiments described above, e.g., see 1114 of FIG. 11C.

According to one embodiment, the first and second portions 1304, 1306 may be selectively positionable together for compensating for tape skew and for track following. For example, the transducer pitch presented to a tape of the first and second portions 1304, 1306, in addition to the positioning of the first and second portions 1304, 1306 in a direction orthogonal to an intended direction of tape travel (e.g., relative to data tracks on a tape), as a single unit may be adjusted together to follow tape skew, TDI and track following.

However, according to other embodiments, the first and second portions 1304, 1306 may be selectively positionable relative to each other. For example, the second portion may be independently positionable relative to the first portion, e.g., for compensating for tape skew and/or for track following.

In one embodiment, the first and second portions 1304, 1306 may be selectively positionable together for compensating for tape skew, while the second portion may also be selectively positionable in a direction orthogonal to the intended direction 1120 of tape travel, e.g., for track following. For example, the transducer pitch presented to a tape of the first and second portions 1304, 1306 may be adjusted together to follow tape skew, while the second portion 1306 track follows and compensates TDI within the first portion 1304.

In yet another embodiment, the first portion 1304 may be fixed in the apparatus 1300 thereby preventing movement of the first portion 1304 relative to the bulk of the apparatus 1300. However, the second portion 1306 is selectively positionable for compensating for tape skew and for track following.

In a further embodiment, the first portion 1304 is coupled to a coarse actuator that may move the first and second portions along a line oriented orthogonally to the intended direction 1120 of tape travel. The first portion may not be tiltable relative to the line. However, the second portion 1306 may be selectively positionable for compensating for tape skew and for track following.

As alluded to above, by incorporating the ability to selectively compensate for TDI, tape skew and/or track following by adjustment of only the first portion, only the second portion, or both the first and second portions depending on the desired embodiment, the efficiency of the apparatus 1300 improves greatly. For example, if a tape is being read and/or written to and the tape experiences skew that causes the data tracks to become misaligned with the transducers of the apparatus, but not enough skew to cause the tape to be in danger of sliding off the edge of the overall TBS, adjustments may be made to the positioning of the second portion of the apparatus such that the transducers of the second portion may be realigned with the data tracks on the skewed tape without having to adjust the positioning of the entire TBS when appropriate, e.g., both the first and the second portions of the magnetic head.

In various embodiments, the relative motion between the first and second portions 1304, 1306, or lack thereof, as explained in the embodiments above may be achieved by incorporating a number of different designs.

In one embodiment, the entire assembly may be selectively positionable together, e.g., to compensate for TDI, tape skew, and track following. According to one embodiment, to achieve this uniform positioning, the first and second portions 1304, 1306 may be coupled to each other, e.g., using adhesives, straps, fasteners, braces, etc., such that the first and second portions are fixed relative to each other. However, in another embodiment, the mechanism 1312 may be programmed (e.g., controlled) by a controller to position the first and second portions 1304, 1306 in the same manner. In other words, the mechanism may exert a relative amount of force on each of the first and second portions 1304, 1306 in an appropriate direction e.g., to ensure that the transducer pitch presented to a tape for each of the portions 1304, 1306 is about the same.

Therefore, referring again to FIG. 13B, the apparatus 1300 includes a controller 1314 which may be of a type known in the art and/or may include any of the embodiments described above (e.g., see 1116 of FIG. 11C). In various embodiments, the controller 1314 may be configured to control the mechanism 1312 for orienting the first and/or second portions 1304, 1306 (e.g., having the transducers), based on a state of expansion of the tape, skew of the tape, PES, etc., as determined by the apparatus 1300. Therefore, the controller 1314 is preferably electrically coupled to the mechanism 1312 via a wire, a cable, a bus configuration, wirelessly, etc., depending on the desired embodiment, such that information may be transferred therebetween.

Although only one mechanism 1312 is shown in FIG. 13B for positioning both the first and second portions 1304, 1306, in other embodiments, each of the first and second portions 1304, 1306 may be coupled to their own respective mechanisms. Furthermore, each of the mechanisms is preferably coupled (e.g., electrically connected) to the controller 1314 for operation thereof.

With continued reference to FIG. 13B, the first and second portions 1304, 1306, e.g., forming the TBS, have a generally arcuate cross sectional profile. An illustrative range of the average radius of curvature of the first portion 1304 is between about 10 and about 60 mm. According to a preferred embodiment, the radius of the arcuate cross sectional profile of the TBS may be about 30 mm, but may be higher or lower depending on the desired embodiment.

Furthermore, although the second portion 1306 of the apparatus 1300 is illustrated as including modules 1124, 1126 each having an array 1106, 1108 of transducers 1110 respectively, in other embodiments the second portion 1306 may have only one module and/or one array of transducers, three arrays of transducers, four or more arrays of transducers, etc.

Moreover, the second portion 1306 may protrude beyond the TBS of the first portion 1304 towards the tape, e.g., by up to about 1 millimeter.

FIGS. 14-15 depict apparatuses 1400, 1500, according to respective exemplary design configurations. As an option, the present apparatuses 1400, 1500 may be implemented in conjunction with features from any other embodiment listed herein, such as those described with reference to the other FIGS. Of course, however, such apparatuses 1400, 1500 and others presented herein may be used in various applications and/or in permutations which may or may not be specifically described in the illustrative embodiments listed herein. Further, the apparatuses 1400, 1500 presented herein may be used in any desired environment. Thus FIGS. 14-15 (and the other FIGS.) should be deemed to include any and all possible permutations. It should also be noted that FIG. 15 illustrates similar components as the embodiment of FIG. 14. Accordingly, various components of FIG. 15 have common numbering with those of FIG. 14, but are in no way intended to limit the invention in any way.

Referring now to FIGS. 14-15, the first portion 1404 of the magnetic head 1412 has an opening 1402 which partially encircles the second portion 1406. According to the embodiments illustrated in FIGS. 14-15. the opening 1402 of the first portion 1404 incorporates a design having gaps between opposing parts of the first portion 1404, thereby only partially encircling the second portion 1406.

Furthermore, the second portion 1406 has a first edge 1408 oriented orthogonal to the intended direction 1120 of tape travel, and a second edge 1410 opposite the first edge 1408. However, unlike the second portion 1306 shown in FIGS. 13A-13B for which the second edge of each module 1124, 1126 of the second portion 1306 is oriented about parallel to the arrays of transducers, the second edge 1410 of the second portion 1406 in FIGS. 14-15 is oriented about parallel to the first edge 1408 of the second portion 1406.

Looking now to the embodiment depicted in FIG. 14, the apparatus 1400 includes a second portion 1406 having of a single module which includes two arrays 1414, 1416 of transducers. Alternatively, according to another embodiment, FIG. 15 illustrates the apparatus 1400 having a second portion 1406 which includes a single module having one array 1502 of transducers.

According to various embodiments, any of the arrays of transducers and/or second portion 1406 from either embodiment depicted in FIGS. 14-15 may include any of the embodiments described and/or suggested herein.

Referring to FIG. 15, the second portion 1406 may be movable relative to the first portion 1404 in a direction 1502 orthogonal to the intended direction 1120 of tape travel.

According to an exemplary embodiment, a method for orienting modules having transducers, may be implemented in accordance with one embodiment. Such method may be implemented by the controller of FIG. 11C and/or FIG. 13B but is not limited thereto. As an option, the present method may be implemented in conjunction with features from any other embodiment listed herein, such as those described with reference to the other FIGS. Of course, however, such method and others presented herein may be used in various applications and/or in permutations which may or may not be specifically described in the illustrative embodiments listed herein. Further, the method presented herein may be used in any desired environment.

According to one embodiment, the method may include determining a desired pitch for transducers for reading and/or writing to a magnetic tape. Moreover, the method may optionally include determining a state of expansion of the tape. According to one embodiment, the state of the tape may be used to determine the desired pitch for transducers when reading and/or writing. An exemplary mechanism for establishing the proper pitch is to use the timing interval read by two servo readers to determine the state of the tape, e.g., contracted, expanded or nominal. Although a preferred mode is to use servo data, this is not required. Thus, it may be desirable to determine the state of the tape, e.g., by incorporating any of the embodiments described and/or suggested herein and/or known processes, when determining the desired pitch. However, according to other embodiments, the pitch may be determined using any embodiment described and/or suggested herein, or combinations thereof.

The method further includes orienting a head to achieve the desired pitch, the head having a tape bearing surface having a first edge; and an array of transducers in and/or adjacent the tape bearing surface, the array of transducers being longitudinally oriented at an angle relative to the first edge, the angle being between greater than 0.2° and about 8°. In a preferred embodiment, the first edge may be nominally oriented orthogonally to a direction of tape travel thereacross.

In another embodiment, various steps of the method may be performed concurrently. For example, in one embodiment the proper transducer pitch may be based on data signals. One way to implement this is by first setting the transducer pitch at a nominal value by selecting a nominal angle of orientation, and then adjusting the orientation thereof to obtain a better readback quality across the read channels. The quality may be determined for example by finding the lowest error rate, best signal to noise level, etc.

As an option, the system may continue or periodically monitor the appropriate signals and adjust the orientation. Adjustments can be performed any time, such as during an initialization period prior to reading or writing user data, during readback or writing operations, etc.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a magnetic head, the magnetic head having:
        a first portion and a second portion, the first portion and the second portion together providing a tape bearing surface,
        wherein the first portion has an opening at least partially encircling the second portion,
        the second portion having at least one array of transducers,
        wherein a longitudinal axis of each of the at least one array is defined between opposite ends thereof,
        wherein the longitudinal axis of each of the at least one array of transducers is oriented at an angle relative to a line oriented orthogonally to an intended direction of tape travel thereacross, the angle being between 0.2° and about 10°,
        wherein the second portion has a first edge oriented at a second angle between 0.2° and about 10° relative to the line, and a second edge opposite the first edge, the second edge being oriented at a third angle between 0.2° and about 10° relative to the line.

2. An apparatus as recited in claim 1, wherein the tape bearing surface has a generally arcuate cross sectional profile.

3. An apparatus as recited in claim 1, wherein the first and second edges are oriented about parallel to the at least one array of transducers.

4. An apparatus as recited in claim 1, wherein the opening of the first portion has an edge facing the second portion, the edge extending along a second angle between 0.2° and about 10°.

5. An apparatus as recited in claim 1, wherein the second portion has a second one of the arrays of transducers, wherein the longitudinal axes of the arrays are oriented about parallel to each other, wherein a first of the arrays is offset from the second of the arrays in a direction parallel to the longitudinal axes of the arrays such that at least some of the transducers of the first array are about aligned with at least some of the transducers of the second array in an intended direction of tape travel thereacross.

6. An apparatus as recited in claim 1, comprising:
    a mechanism for orienting the second portion to control a transducer pitch presented to a tape.

7. An apparatus as recited in claim 6, wherein the first and second portions are selectively positionable for compensating for tape skew, wherein the second portion is selectively positionable in a direction orthogonal to the intended direction of tape travel for track following.

8. An apparatus as recited in claim 6, wherein the first and second portions are selectively positionable for compensating for tape skew and for track following.

9. An apparatus as recited in claim 8, wherein the second portion is independently positionable relative to the first portion.

10. An apparatus as recited in claim 6, wherein the first portion is fixed in the apparatus thereby preventing movement thereof relative to the apparatus, wherein the second portion is selectively positionable for compensating for tape skew and for track following.

11. An apparatus as recited in claim 6, wherein the first portion is coupled to a coarse actuator, wherein the first portion is not tiltable relative to the line oriented orthogonally to the intended direction of tape travel, wherein the second portion is selectively positionable for compensating for tape skew and for track following.

12. An apparatus as recited in claim 6, comprising a controller configured to control the mechanism for orienting the at least one array of transducers based on a state of expansion of the tape determined by the apparatus.

13. An apparatus as recited in claim 6, comprising a controller configured to control the mechanism for orienting the at least one array of transducers based on skew of the tape.

14. An apparatus as recited in claim 1, wherein the first portion and the second portion are fixed relative to each other.

15. An apparatus as recited in claim 1, wherein the second portion is selectively positionable relative to the first portion.

16. An apparatus as recited in claim 1, comprising:
    a drive mechanism for passing a magnetic medium over the magnetic head; and
    a controller electrically coupled to the magnetic head.

17. An apparatus, comprising:
    a magnetic head, the magnetic head having:
        a first portion and a second portion, the first portion and the second portion together providing a tape bearing surface,
        wherein the first portion has an opening at least partially encircling the second portion,
        the second portion having at least one array of transducers,
        wherein a longitudinal axis of each of the at least one array is defined between opposite ends thereof,
        wherein the longitudinal axis of each of the at least one array of transducers is oriented at an angle relative to a line oriented orthogonally to an intended direction of tape travel thereacross, the angle being between 0.2° and about 10°,
        wherein the opening of the first portion has an edge facing the second portion, the edge extending along a second angle between 0.2° and about 10°.

18. An apparatus as recited in claim 17, wherein the tape bearing surface has a generally arcuate cross sectional profile.

19. An apparatus as recited in claim 17, wherein the second portion has a second one of the arrays of transducers, wherein the longitudinal axes of the arrays are oriented about parallel to each other, wherein a first of the arrays is offset from the second of the arrays in a direction parallel to the longitudinal axes of the arrays such that at least some of the transducers of the first array are about aligned with at least some of the transducers of the second array in an intended direction of tape travel thereacross.

20. An apparatus as recited in claim 17, comprising:
a mechanism for orienting the second portion to control a transducer pitch presented to a tape.

\* \* \* \* \*